US012698881B1

(12) United States Patent
Hammer et al.

(10) Patent No.: US 12,698,881 B1
(45) Date of Patent: Aug. 4, 2026

(54) LAMPSHADE WITH REMOVABLE PANELS AND A METHOD OF ASSEMBLING THE SAME

(71) Applicant: Ryan William Hammer, Canal Winchester, OH (US)

(72) Inventors: Ryan William Hammer, Canal Winchester, OH (US); Steven Andrew Sauer, Columbus, OH (US)

(73) Assignee: Ryan William Hammer, Canal Winchester, OH (US)

( * ) Notice: Subject to any disclaimer, the term of this patent is extended or adjusted under 35 U.S.C. 154(b) by 0 days.

(21) Appl. No.: 19/076,819

(22) Filed: Mar. 11, 2025

Related U.S. Application Data

(60) Provisional application No. 63/563,904, filed on Mar. 11, 2024.

(51) Int. Cl.
*F21V 1/12* (2006.01)
*F21V 1/00* (2006.01)
*F21V 1/04* (2006.01)
*F21V 17/00* (2006.01)

(52) U.S. Cl.
CPC .................. *F21V 1/12* (2013.01); *F21V 1/00* (2013.01); *F21V 1/04* (2013.01); *F21V 17/002* (2013.01)

(58) Field of Classification Search
CPC . F21V 1/12; F21V 1/04; F21V 17/002; F21V 1/00; F21V 1/08
USPC ......................................... 362/351, 356, 360
See application file for complete search history.

(56) References Cited

U.S. PATENT DOCUMENTS

| | | | | | |
|---|---|---|---|---|---|
| 671,814 | A * | 4/1901 | Catlin | | |
| 1,335,640 | A * | 3/1920 | Beales | F21V 1/00 | 362/360 |
| 3,582,643 | A * | 6/1971 | Heise | F21V 1/00 | 362/360 |
| 3,688,707 | A | 9/1972 | White | | |
| 4,656,568 | A * | 4/1987 | Reed | F21V 1/06 | 362/358 |
| 4,766,685 | A | 8/1988 | Kramer | | |
| 5,532,912 | A * | 7/1996 | Bendit | F21V 1/00 | 362/357 |
| 6,439,746 | B2 * | 8/2002 | Huang | F21V 1/06 | 362/450 |
| 6,821,002 | B1 | 11/2004 | Morgen | | |
| 7,204,618 | B1 * | 4/2007 | Kuelbs | F21S 9/037 | 362/35 |
| 7,314,293 | B2 * | 1/2008 | Steier | F21S 13/12 | 40/554 |
| 10,139,058 | B2 | 11/2018 | Santiago | | |
| 11,617,441 | B2 | 4/2023 | Hazarian | | |

(Continued)

*Primary Examiner* — Laura K Tso
(74) *Attorney, Agent, or Firm* — The Law Office of Patrick F. O'Reilly III, LLC

(57) ABSTRACT

A lampshade configured to be disposed on a lamp is disclosed herein. The lampshade includes a lampshade frame, the lampshade frame including a plurality of frame members, at least one of the plurality of frame members including at least one slot formed in the at least one of the plurality of frame members; and one or more removable panels, at least one of the one or more removable panels having a translucent portion, and the at least one of the one or more removable panels having at least one panel hook portion configured to be received within the at least one slot of the at least one of the plurality of frame members.

20 Claims, 12 Drawing Sheets

(56) References Cited

U.S. PATENT DOCUMENTS

| | | | |
|---|---|---|---|
| 11,629,841 B1 | 4/2023 | Massoni | |
| 2006/0023460 A1 | 2/2006 | Steier et al. | |
| 2015/0267901 A1 | 9/2015 | Cohen et al. | |
| 2016/0238213 A1 | 8/2016 | Kimmet | |
| 2021/0222853 A1* | 7/2021 | Beck | F21V 1/143 |
| 2023/0138548 A1 | 5/2023 | Massoni | |

* cited by examiner

DETAIL "A"

SECTION A-A

FIG. 16
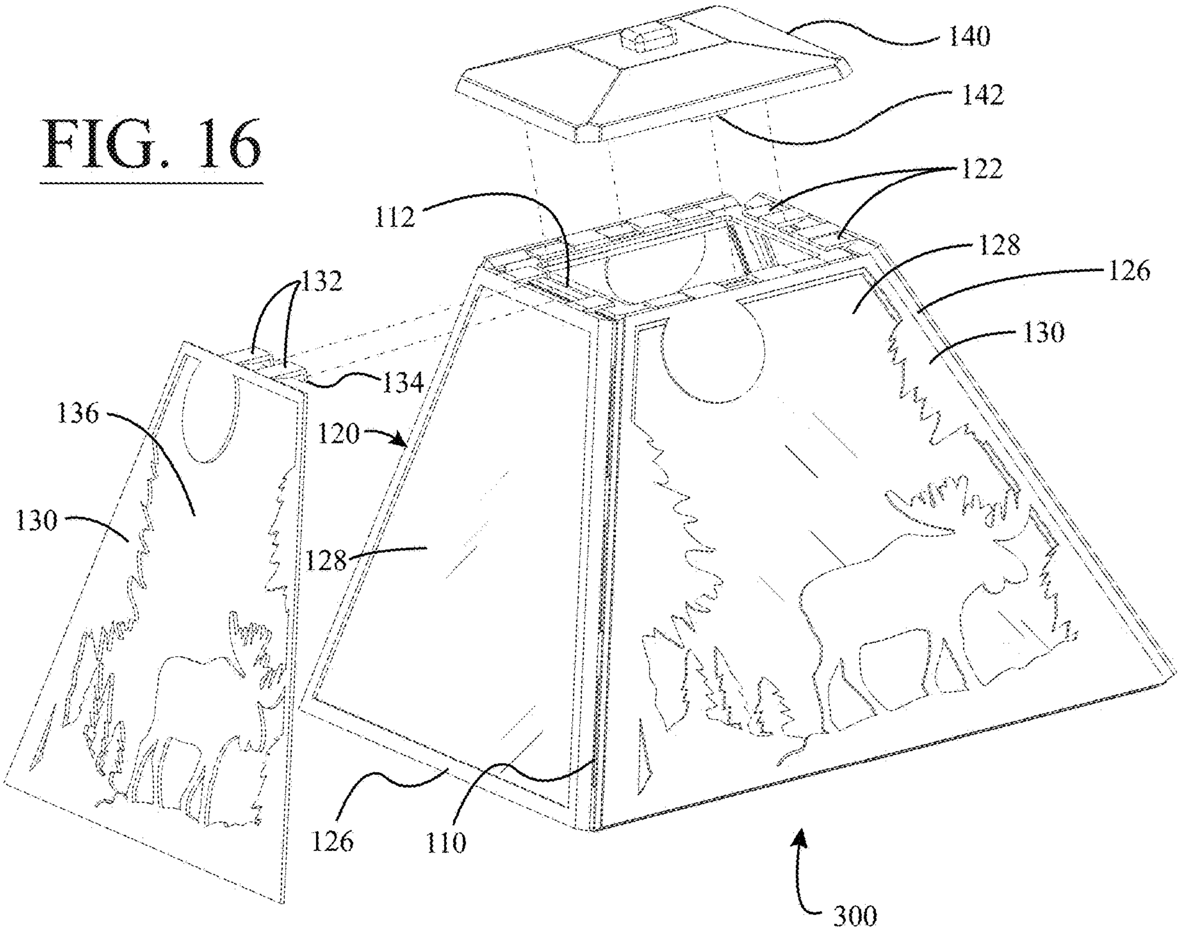
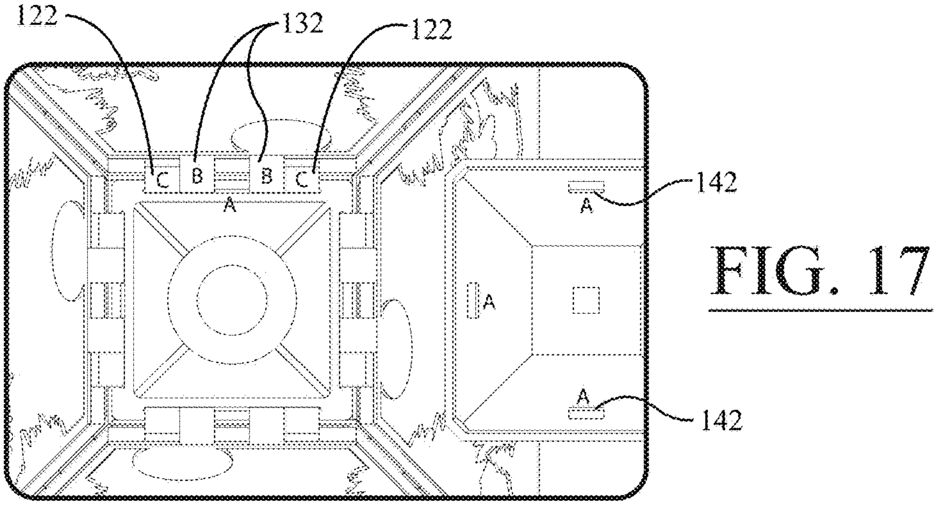
FIG. 17

LAMPSHADE WITH REMOVABLE PANELS AND A METHOD OF ASSEMBLING THE SAME

CROSS-REFERENCE TO RELATED APPLICATIONS

This patent application claims priority to, and incorporates by reference in its entirety, U.S. Provisional Patent Application No. 63/563,904, entitled "Lampshade With Removable Panels And A Method Of Assembling The Same", filed on Mar. 11, 2024.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable

INCORPORATION BY REFERENCE OF MATERIAL SUBMITTED ON A COMPACT DISK

Not Applicable.

BACKGROUND OF THE INVENTION

1. Field of the Invention

The invention generally relates to a lampshade. More particularly, the invention relates to a lampshade with removable panels and a method of assembling the same.

2. Background

Traditional lampshades serve the primary purpose of diffusing and directing light from a lamp. Over time, various designs, materials, and construction methods have evolved to enhance not just the utility, but also the aesthetic appeal of lampshades. Stained glass lampshades, in particular, have garnered admiration for their vibrant colors and intricate designs, adding to the ambiance and decor of spaces where they are used. However, conventional stained glass lampshades come with a set design and pattern, limiting the user's ability to alter or customize them according to changing tastes, occasions, or room themes. Additionally, the fixed design nature of these lampshades does not allow for easy modification, making it challenging for users desiring a periodic refresh of their decor without incurring the cost and effort of obtaining a new lampshade.

While some conventional lampshades offer adjustable brightness or the addition of minor decorative elements, none provide the flexibility to interchange significant portions of the shade. This limitation restricts users from having a dynamic and adaptable lighting piece in their homes or offices. Furthermore, the integration of silhouette scenes or logos on traditional stained glass lampshades, if at all present, is permanent and non-interchangeable. This static nature of design elements limits the adaptability of the lampshade to different events, seasons, or user preferences.

There exists a need for a lampshade that includes one or more removable panels that are interchangeable and/or replaceable so as to allow for a dynamic and adaptable lighting piece in one's home or office.

BRIEF SUMMARY OF EMBODIMENTS OF THE INVENTION

Accordingly, the present invention is directed to a lampshade with removable panels and a method of assembling the same that substantially obviates one or more problems resulting from the limitations and deficiencies of the related art.

In accordance with one or more embodiments of the present invention, there is provided a lampshade configured to be disposed on a lamp. The lampshade includes a lampshade frame, the lampshade frame including a plurality of frame members, at least one of the plurality of frame members including at least one slot formed in the at least one of the plurality of frame members; and one or more removable panels, at least one of the one or more removable panels having a translucent portion, and the at least one of the one or more removable panels having at least one panel hook portion configured to be received within the at least one slot of the at least one of the plurality of frame members.

In a further embodiment of the present invention, the plurality of frame members of the lampshade frame define a plurality of side openings, and at least one of the plurality of side openings is configured to be covered by the at least one of the one or more removable panels.

In yet a further embodiment, the plurality of frame members of the lampshade frame comprise one or more top frame members, a plurality of side frame members, and one or more bottom frame members; and the at least one of the plurality of frame members that includes the at least one slot is at least one of the one or more top frame members.

In still a further embodiment, the one or more removable panels comprise a plurality of interchangeable panels, and the at least one slot comprises a plurality of slots formed in one or more of the plurality of frame members; and each of the plurality of interchangeable panels comprises at least one respective panel hook portion configured to be received in a respective one of the plurality of slots formed in the one or more of the plurality of frame members, the plurality of interchangeable panels being disposed on different sides of the lampshade.

In yet a further embodiment, the translucent portion of the at least one of the one or more removable panels is formed by a translucent glass panel or a translucent polymeric panel disposed within an outer peripheral frame member.

In still a further embodiment, the at least one panel hook portion is connected to the outer peripheral frame member of the at least one of the one or more removable panels by a panel tab portion, the panel tab portion extending outwardly from the outer peripheral frame member, and the at least one panel hook portion extending downwardly in a generally vertical orientation.

In yet a further embodiment, the lampshade further comprises a panel gasket member, the panel gasket member configured to be disposed between a rear surface of the at least one of the one or more removable panels and a front surface of one or more of the plurality of frame members, the panel gasket member configured to dampen a movement of the at least one of the one or more removable panels relative to the one or more of the plurality of frame members, and the panel gasket member further configured to block light generated by a light source of the lamp from escaping between the front surface of the one or more of the plurality of frame members and the rear surface of the at least one of the one or more removable panels.

In still a further embodiment, the lampshade further comprises one or more decorative overlay panels, at least one of the one or more decorative overlay panels configured to fit over the at least one of the one or more removable panels, the at least one of the one or more decorative overlay panels having at least one generally opaque decorative portion, and the at least one of the one or more decorative overlay panels having at least one overlay hook portion configured to be received within the at least one slot of the at least one of the plurality of frame members, the at least one overlay hook portion configured to be received within the at least one slot in a second location separate from a first location occupied by the at least one panel hook portion, thereby allowing for simultaneous attachment of both the at least one of the one or more removable panels and the at least one of the one or more decorative overlay panels to the at least one of the plurality of frame members of the lampshade frame without interference.

In yet a further embodiment, the at least one overlay hook portion is connected to an outer peripheral frame of the at least one of the one or more decorative overlay panels by an overlay tab portion, the overlay tab portion extending outwardly from the outer peripheral frame, and the at least one overlay hook portion extending downwardly in a generally vertical orientation.

In still a further embodiment, the lampshade further comprises a top cap member configured to fit over a top portion of the lampshade frame, the top cap member having at least one tab portion extending downwardly from a bottom surface of the top cap member, the at least one cap tab portion configured to be received within the at least one slot of the at least one of the plurality of frame members, the at least one cap tab portion configured to be received within the at least one slot in a third location separate from the first and second locations occupied respectively by the at least one panel hook portion and the at least one overlay hook portion, thereby allowing for simultaneous attachment of the top cap member, the at least one of the one or more decorative overlay panels, and the at least one of the one or more removable panels to the at least one of the plurality of frame members of the lampshade frame without interference.

In yet a further embodiment, the lampshade further comprises a top cap gasket member, the top cap gasket member configured to be disposed between the bottom surface of the top cap member and the at least one of the plurality of frame members with the at least one slot.

In still a further embodiment, the at least one panel hook portion of the at least one of the one or more removable panels comprises a pair of spaced-apart panel hook portions, the pair of spaced-apart panel hook portions configured to be received within the at least one slot of the at least one of the plurality of frame members.

In still a further embodiment, the plurality of frame members of the lampshade frame comprise a top frame member, a plurality of side frame members, and one or more bottom frame members; the at least one of the plurality of frame members that includes the at least one slot is the top frame member; and the top frame member further includes at least one elongate aperture disposed through the top frame member, the at least one elongate aperture being spaced apart from the at least one slot of the top frame member.

In yet a further embodiment, the lampshade frame further comprises at least one vertical support arm attached to a retention ring member, the at least one vertical support arm including an end portion that is configured to be received within the at least one elongate aperture of the top frame member, and the retention ring member being configured to attach the lampshade frame to a light bulb socket in a lamp.

In still a further embodiment, the at least one vertical support arm of the lampshade frame further comprises a top offset portion forming a support surface on which a portion of the top frame member is configured to rest; and the end portion of the at least one vertical support arm of the lampshade frame is in a form of a threaded end portion that is configured to be threadingly engaged with a fastener member, the portion of the top frame member configured to be sandwiched between the fastener member and the top offset portion of the at least one vertical support arm.

In accordance with one or more other embodiments of the present invention, there is provided a method for assembling a lampshade. The method comprising the steps of: (i) providing a lampshade that includes a lampshade frame, the lampshade frame including a plurality of frame members, at least one of the plurality of frame members including at least one slot formed in the at least one of the plurality of frame members; and one or more removable panels, at least one of the one or more removable panels having a translucent portion, and the at least one of the one or more removable panels having at least one panel hook portion configured to be received within the at least one slot of the at least one of the plurality of frame members; (ii) aligning the at least one panel hook portion of the at least one of the one or more removable panels with the at least one slot formed in the at least one of the plurality of frame members; and (iii) inserting the at least one panel hook portion of the at least one of the one or more removable panels into the at least one slot formed in the at least one of the plurality of frame members so as to hang the at least one of the one or more removable panels on the lampshade frame.

In a further embodiment of the present invention, the one or more removable panels comprise a plurality of interchangeable panels, the at least one panel hook portion comprises one or more respective hook portions on each of the plurality of interchangeable panels, and the at least one slot comprises a plurality of slots formed in one or more of the plurality of frame members; and the method further comprises the steps of: (iv) aligning each of the one or more respective hook portions on each of the plurality of interchangeable panels with a respective one of the plurality of slots formed in the one or more of the plurality of frame members; and (v) inserting each of the one or more respective hook portions on each of the plurality of interchangeable panels into the respective one of the plurality of slots formed in the one or more of the plurality of frame members so as to hang the plurality of interchangeable panels around sides of the lampshade frame.

In yet a further embodiment, the method further comprises the steps of: (iv) providing one or more decorative overlay panels, at least one of the one or more decorative overlay panels configured to fit over the at least one of the one or more removable panels, the at least one of the one or more decorative overlay panels having at least one generally opaque decorative portion, and the at least one of the one or more decorative overlay panels having at least one overlay hook portion configured to be received within the at least one slot of the at least one of the plurality of frame members, the at least one overlay hook portion configured to be received within the at least one slot in a second location separate from a first location occupied by the at least one panel hook portion; (v) aligning the at least one overlay hook portion of the at least one of the one or more decorative overlay panels with the at least one slot formed in the at least one of the plurality of frame members; and (vi) inserting the at least one overlay hook portion of the at least one of the one or more decorative overlay panels into the second location of the at least one slot formed in the at least one of the plurality of frame members so as to hang the at least one of the one or more decorative overlay panels on the lampshade frame over the at least one of the one or more removable panels.

In still a further embodiment, the method further comprises the steps of: (vii) providing a top cap member configured to fit over a top portion of the lampshade frame, the top cap member having at least one tab portion extending downwardly from a bottom surface of the top cap member, the at least one cap tab portion configured to be received within the at least one slot of the at least one of the plurality of frame members, the at least one cap tab portion configured to be received within the at least one slot in a third location separate from the first and second locations occupied respectively by the at least one panel hook portion and the at least one overlay hook portion; (viii) aligning the at least one tab portion of the top cap member with the at least one slot formed in the at least one of the plurality of frame members; and (ix) inserting the at least one tab portion of the top cap member into the third location of the at least one slot formed in the at least one of the plurality of frame members so as to attach the top cap member on the top portion of the lampshade frame.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which:

FIG. 16 is a top-side perspective view of the lampshade of FIG. 13, wherein the removable nature of the decorative overlay panels and top cap member is depicted;

FIG. 17 is a partial top plan view of the lampshade of FIG. 13, wherein the top cap member is removed and flipped over to illustrate the arrangement of the tab and hook portions in the slots of the lampshade frame;

Throughout the figures, the same parts are always denoted using the same reference characters so that, as a general rule, they will only be described once.

DETAILED DESCRIPTION OF EMBODIMENTS OF THE INVENTION

Figure 1:
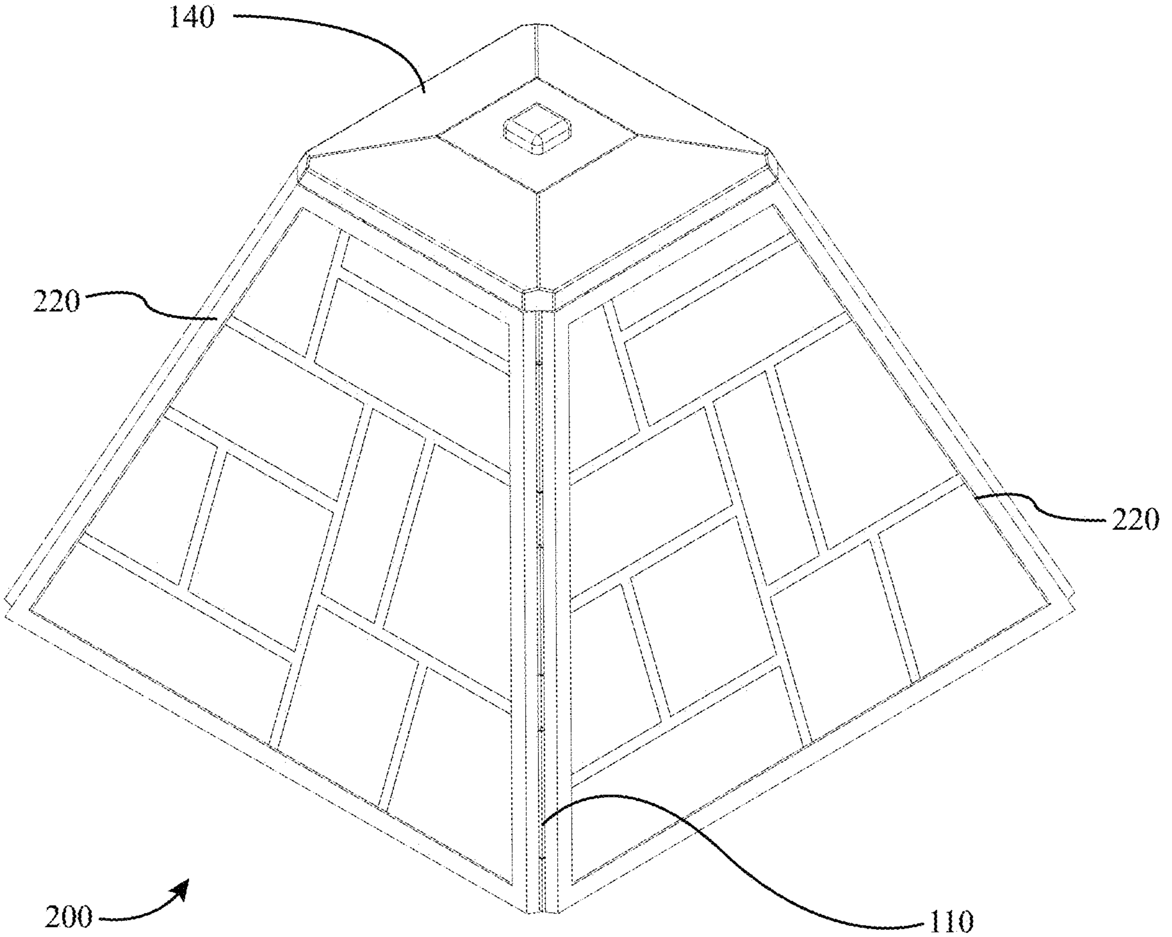
FIG. 1 is a top-side perspective view of a lampshade with removable panels, according to a second illustrative embodiment of the invention.
Figure 2:
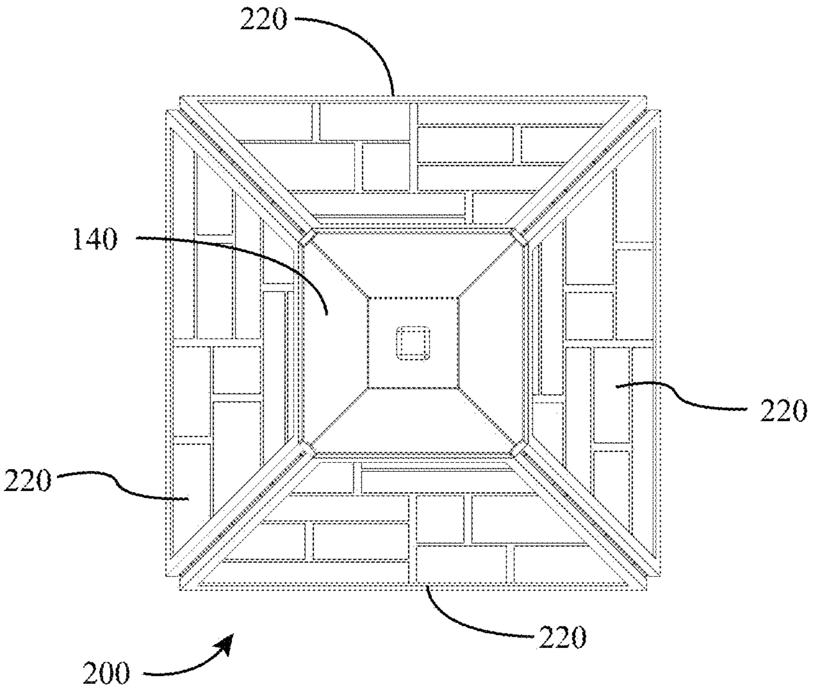
FIG. 2 is a top plan view of the lampshade of FIG. 1.
Figure 12:
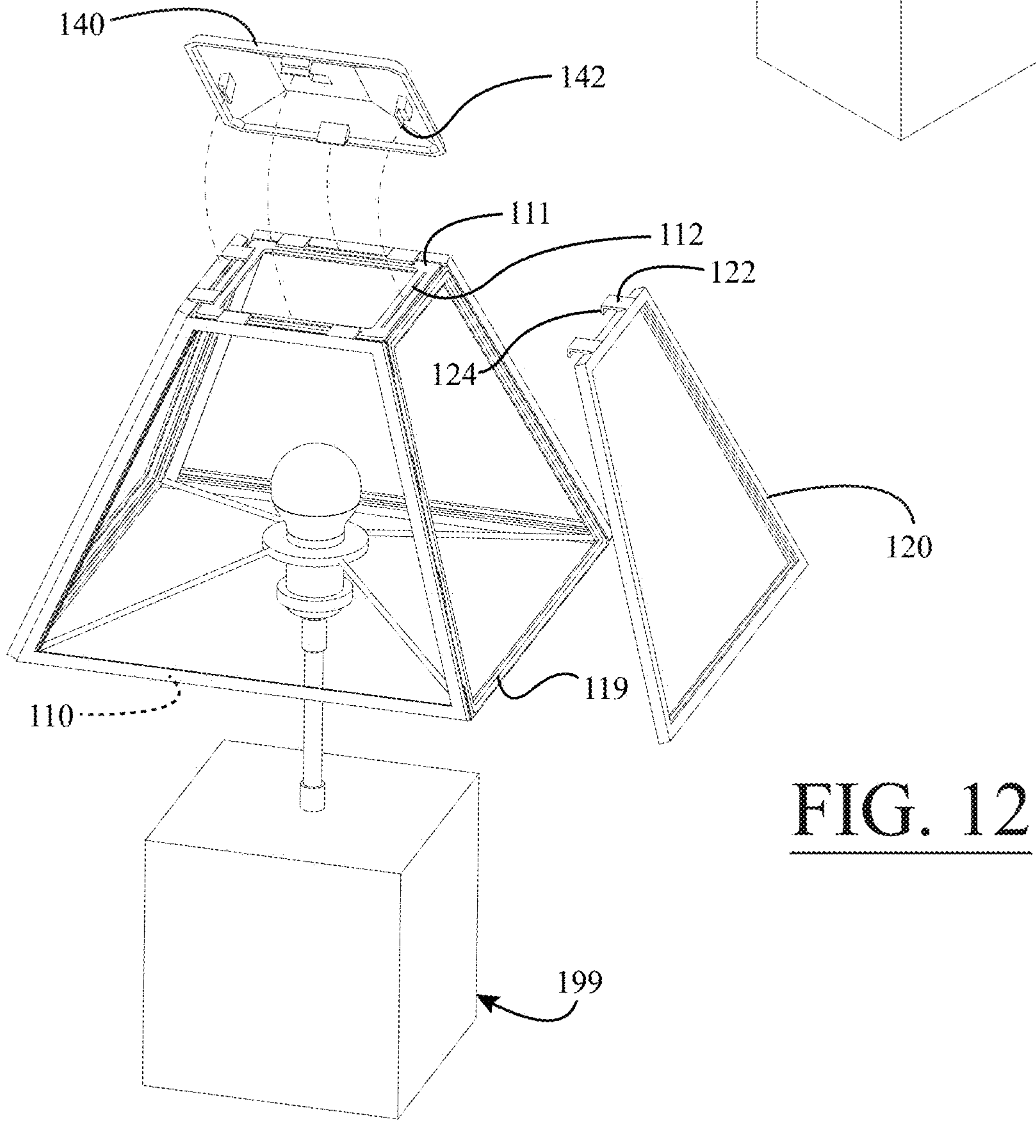
FIG. 12 is a partially exploded perspective view of the lampshade and lamp of FIG. 11, wherein the removable nature of the side panels and top cap member is depicted.
Figure 18:
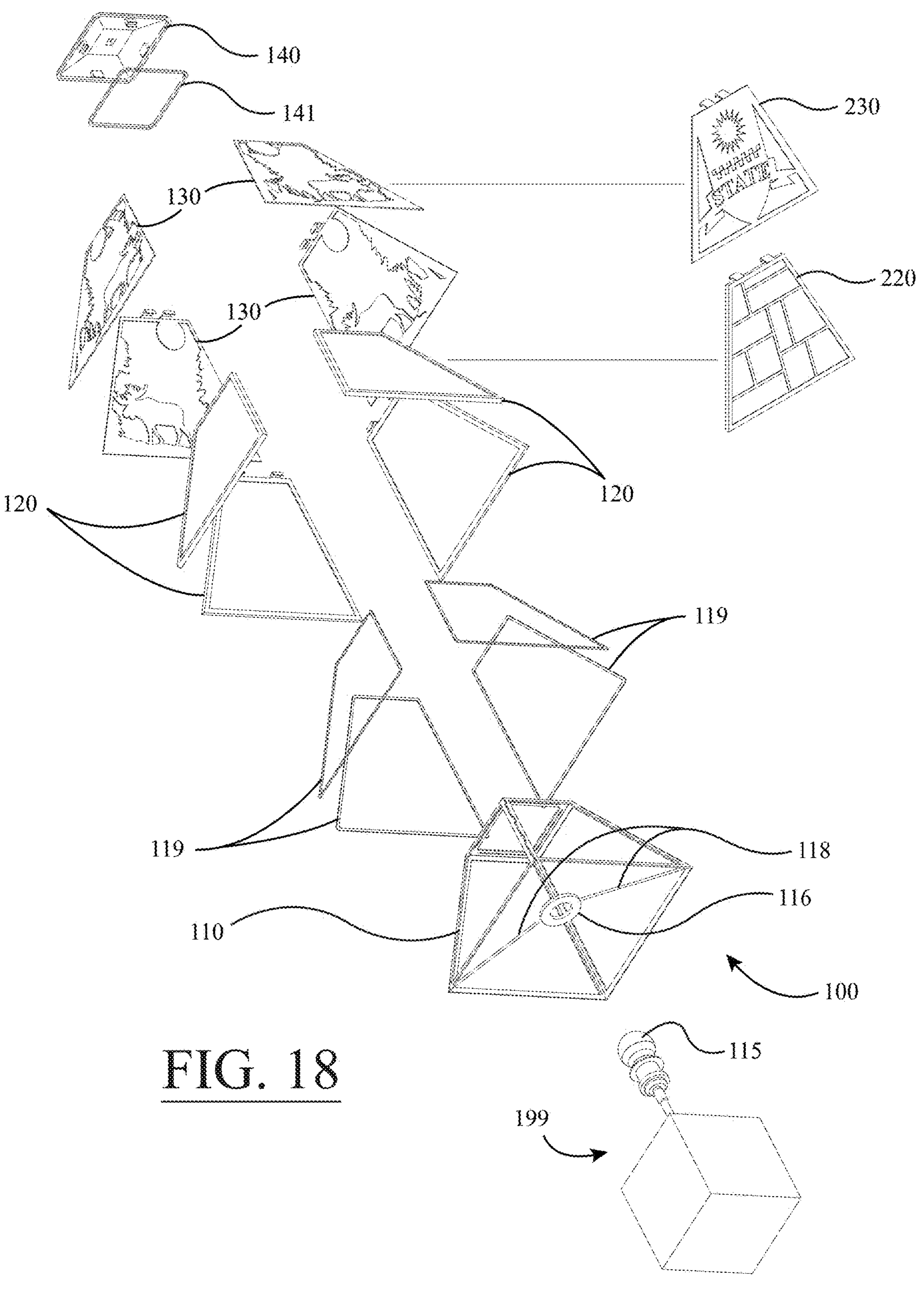
FIG. 18 is an overall exploded perspective view of the lampshade and lamp of FIG. 11.

A first illustrative embodiment of a lampshade is seen generally at 100 in FIGS. 12 and 18. The lampshade 100 is configured to be disposed on a lamp with a lamp base 199. With initial reference to FIGS. 1, 12, and 18, it can be seen that the lampshade 100 generally comprises a lampshade frame 110, the lampshade frame 110 including a plurality of frame members, a top frame member 111 of the plurality of frame members including a plurality of slots 112 formed in the top frame member 111; and a plurality of removable panels 120, each of the plurality of removable panels 120 having a translucent portion, and each of the plurality of removable panels 120 having a pair of panel hook portions 124 configured to be received within one of the plurality of slots 112 of the top frame member 111 (i.e., the top deck of the lampshade frame 110).

As shown in FIG. 12, in the illustrative embodiment, the plurality of frame members of the lampshade frame 110 define a plurality of side openings that are configured to be covered by respective ones of the plurality of removable panels 120. In the illustrative embodiment, the plurality of frame members of the lampshade frame 110 may be formed from metal, and welded together so as to form a unitary frame structure.

In the illustrative embodiment, referring to FIGS. 12 and 18, it can be seen that the plurality of frame members of the lampshade frame 110 include the top frame member 111 with the slots 112, a plurality of side frame members, and a plurality of bottom frame members.

In the illustrative embodiment, referring again to FIGS. 12 and 18, the plurality of removable panels comprise a plurality of interchangeable panels 120, with one (1) panel 120 on each side of the lampshade 100 (e.g., four (4) total panels 120 arranged in a symmetrical pyramidal configuration). In the illustrative embodiment, each of the plurality of interchangeable panels 120 comprises a respective pair of panel hook portions 124 configured to be received in a respective one of the plurality of slots 112 formed in the top frame member 111. In the illustrative embodiment, the plurality of interchangeable panels 120 are disposed on different sides of the lampshade 100.

Figure 15:
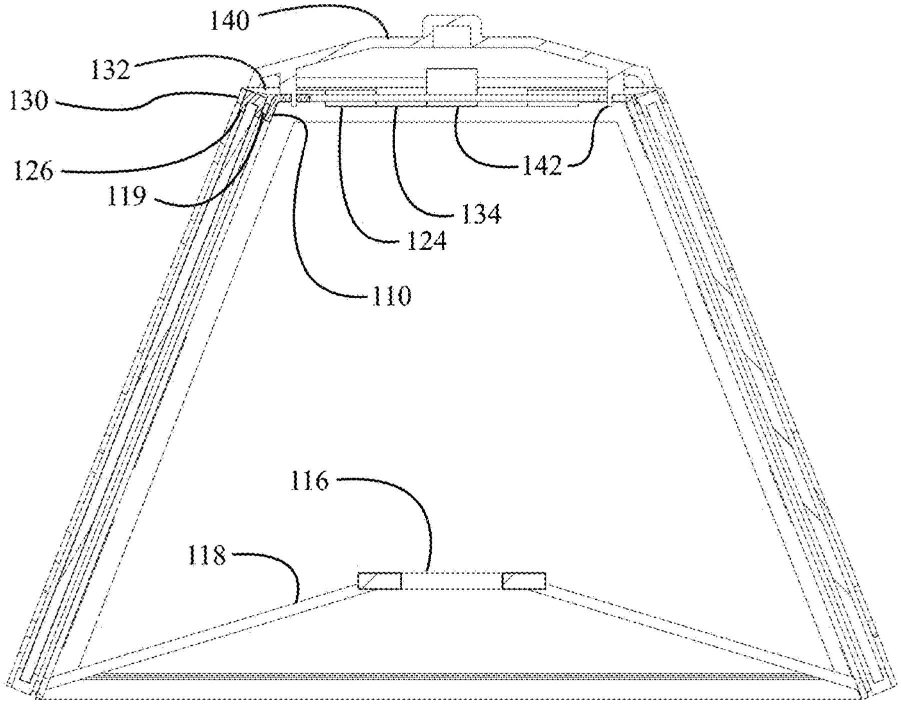
FIG. 15 is a sectional view cut through the lampshade of FIG. 13, wherein the section is generally cut along the cutting-plane line A-A in FIG. 13.

Referring to FIGS. 12, 15, and 18, in the illustrative embodiment, the translucent portion of the plurality of removable panels 120 is formed by a translucent glass panel (e.g., a solid glass pane) disposed within an outer peripheral frame member 126. For example, in the illustrative embodiment, the outer peripheral frame member 126 may be in a form of a C-channel frame for added structural support (e.g., a ¼" C-channel).

In the illustrative embodiment, turning to FIGS. 12, 15, and 16, the pair of panel hook portions 124 are connected to the outer peripheral frame member 126 of each of the plurality of removable panels 120 by respective panel tab portions 122. As shown in FIGS. 12 and 16, the panel tab portions 122 extend outwardly from the outer peripheral frame member 126, and the panel hook portions 124 extend downwardly in generally vertical orientations.

Now, referring again to FIGS. 12 and 18, in the illustrative embodiment, the lampshade 100 further comprises a plurality of panel gasket members 119. Each of the panel gasket members 119 is configured to be disposed between a rear surface of a respective one of the plurality of removable panels 120 and a front surface of a set of the side frame members of the lampshade frame 110. The panel gasket members 119 are configured to dampen a movement of the respective one of the plurality of removable panels 120 relative to the respective set of the side frame members of the lampshade frame 110. The panel gasket members 119 are further configured to block light generated by a light source of the lamp from escaping between the front surface of the respective set of the side frame members and the rear surface of the respective one of the plurality of removable panels 120. That is, the panel gasket members 119 are configured for light leakage prevention and vibration dampening between the removable panels 120 and the lampshade frame 110 (e.g., if the lampshade is subjected to external building vibrations).

A second illustrative embodiment of a lampshade is seen generally at 200 in FIGS. 1-10. Referring to these figures, it can be seen that, in most respects, the second illustrative embodiment is the same as the first illustrative embodiment. Moreover, nearly all of the elements are common to both such embodiments. For the sake of brevity, the elements that the second embodiment of the lampshade has in common with the first embodiment will not be discussed because these components have already been described above.

As shown in FIGS. 1-10, similar to the lampshade 100 described above, the lampshade 200 generally comprises a lampshade frame 110, the lampshade frame 110 including a plurality of frame members, a top frame member 111 of the plurality of frame members including a plurality of slots 112 formed in the top frame member 111; and a plurality of removable panels 220, each of the plurality of removable panels 220 having a translucent portion, and each of the plurality of removable panels 220 having a pair of panel hook portions 224 configured to be received within one of the plurality of slots 112 of the top frame member 111.

However, referring to FIGS. 1-9, it can be seen that the plurality of removable panels 220 of the lampshade 200 are different from the plurality of removable panels 120 of the lampshade 100. In particular, rather than having removable panels 120 with plain glass panes as described above in conjunction with the first embodiment, the removable panels 220 of the second embodiment have stained glass panes within the outer peripheral frame members. In this embodiment, the lampshade 200 is provided with stained glass side panels 220, showcasing a multi-glass framework that highlights the versatility and customizable nature of the panel styles, colors, and textures.

Figure 9:
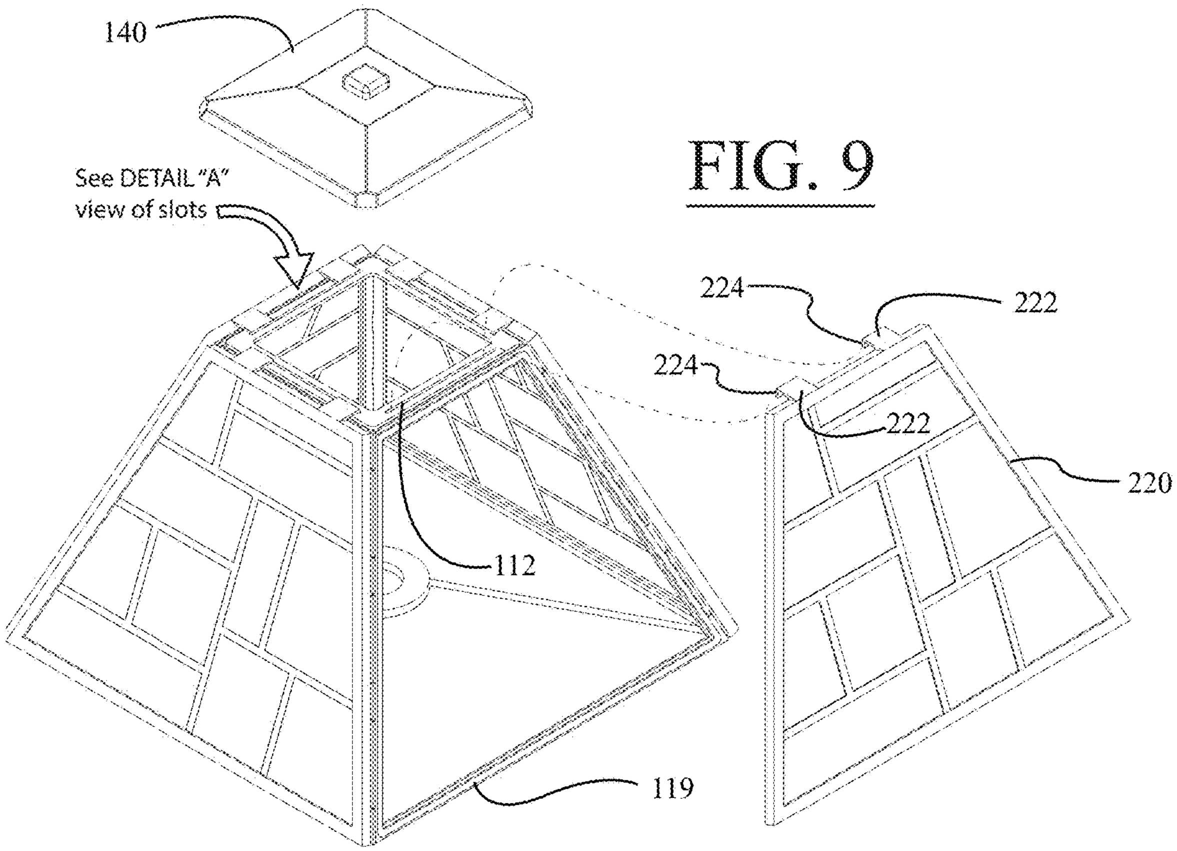
FIG. 9 is another top-side perspective view of the lampshade of FIG. 1, wherein the removable nature of the side panels and top cap member is depicted.
Figure 10:
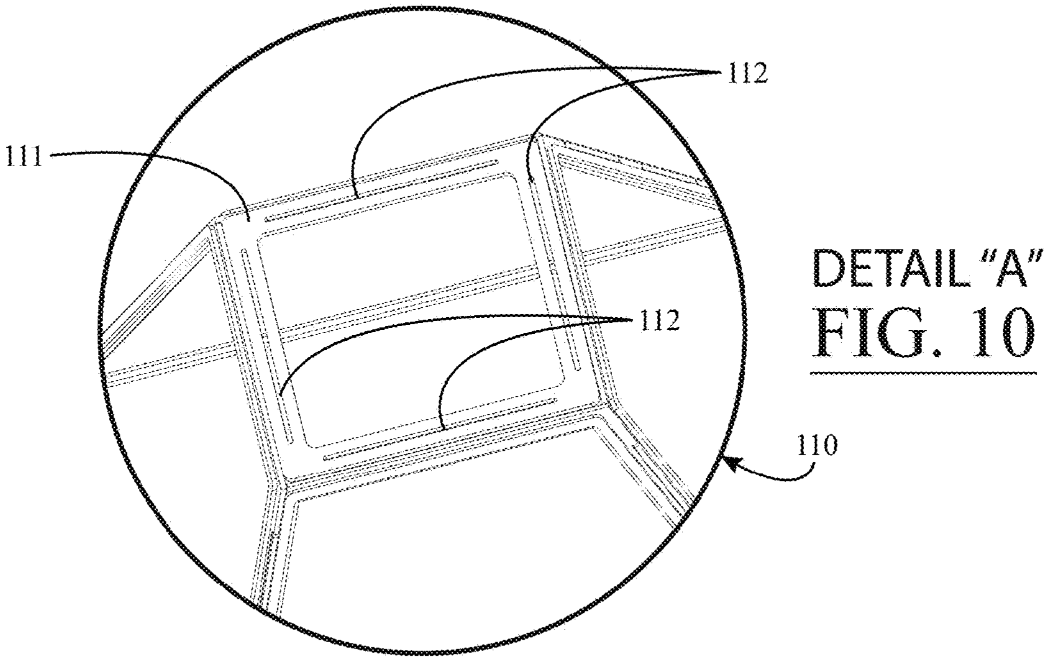
FIG. 10 is an enlarged detail view of a top frame member of the lampshade of FIG. 1, wherein the plurality of slots in the top frame member are shown (Detail "A")
Figure 11:
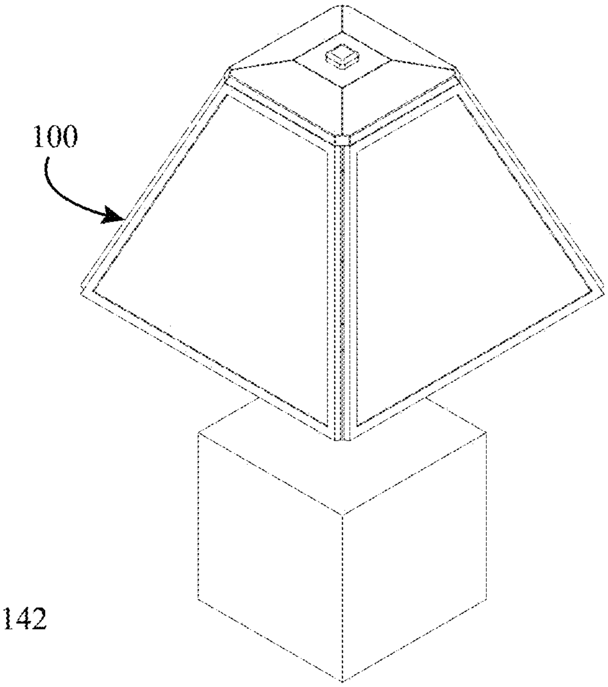
FIG. 11 is a perspective view of a lampshade with removable panels disposed on a lamp, according to a first illustrative embodiment of the invention.

In the second illustrative embodiment, similar to the first illustrative embodiment, turning to FIG. 9, the pair of panel hook portions 224 are connected to the outer peripheral frame member of each of the plurality of removable panels 220 by respective panel tab portions 222. As shown in FIG. 9, the panel tab portions 222 extend outwardly from the outer peripheral frame member, and the panel hook portions 224 extend downwardly in generally vertical orientations.

Figure 3:
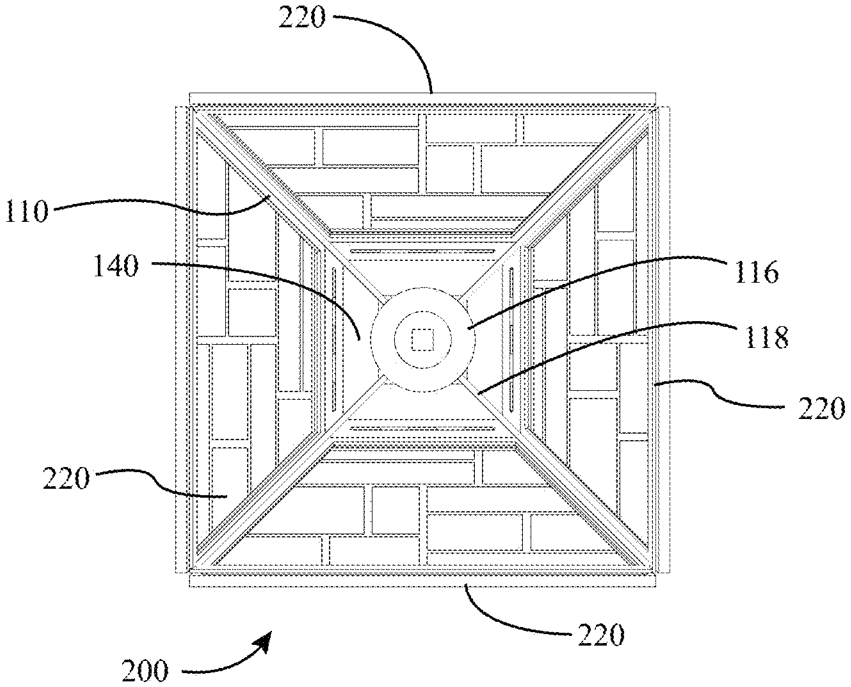
FIG. 3 is a bottom plan view of the lampshade of FIG. 1.
Figure 4:
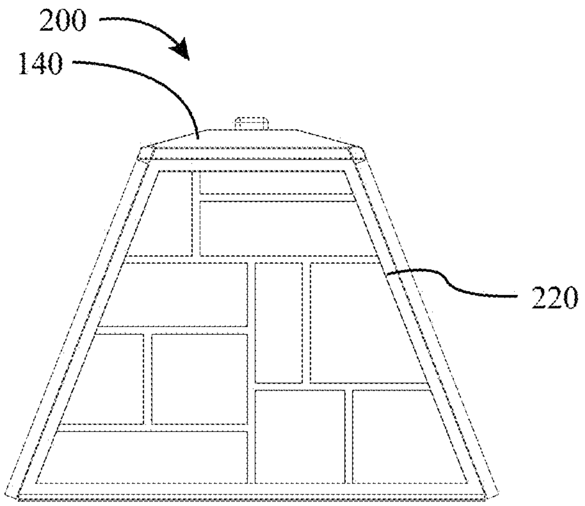
FIG. 4 is a front elevational view of the lampshade of FIG. 1.
Figure 5:
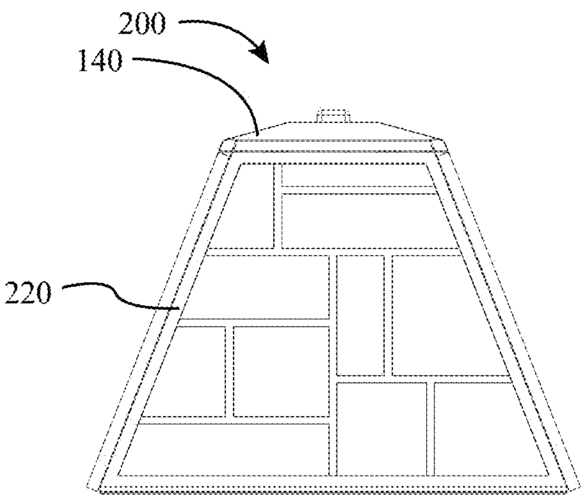
FIG. 5 is a rear elevational view of the lampshade of FIG. 1.
Figure 6:
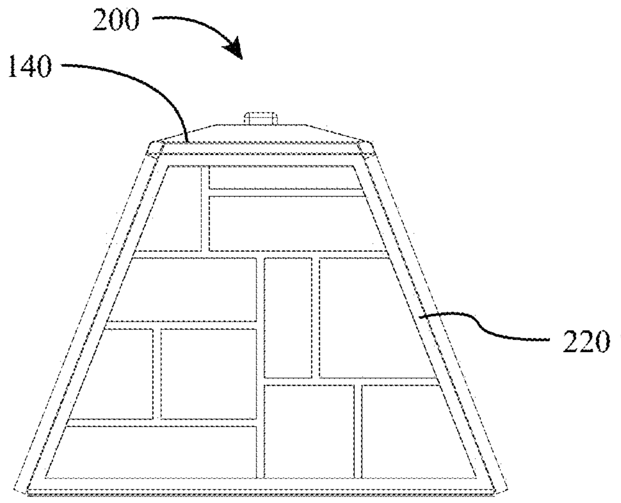
FIG. 6 is a first side elevational view of the lampshade of FIG. 1.
Figure 7:
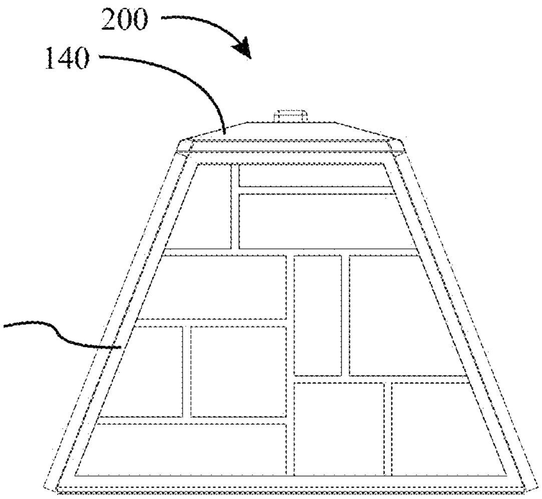
FIG. 7 is a second side elevational view of the lampshade of FIG. 1.
Figure 8:
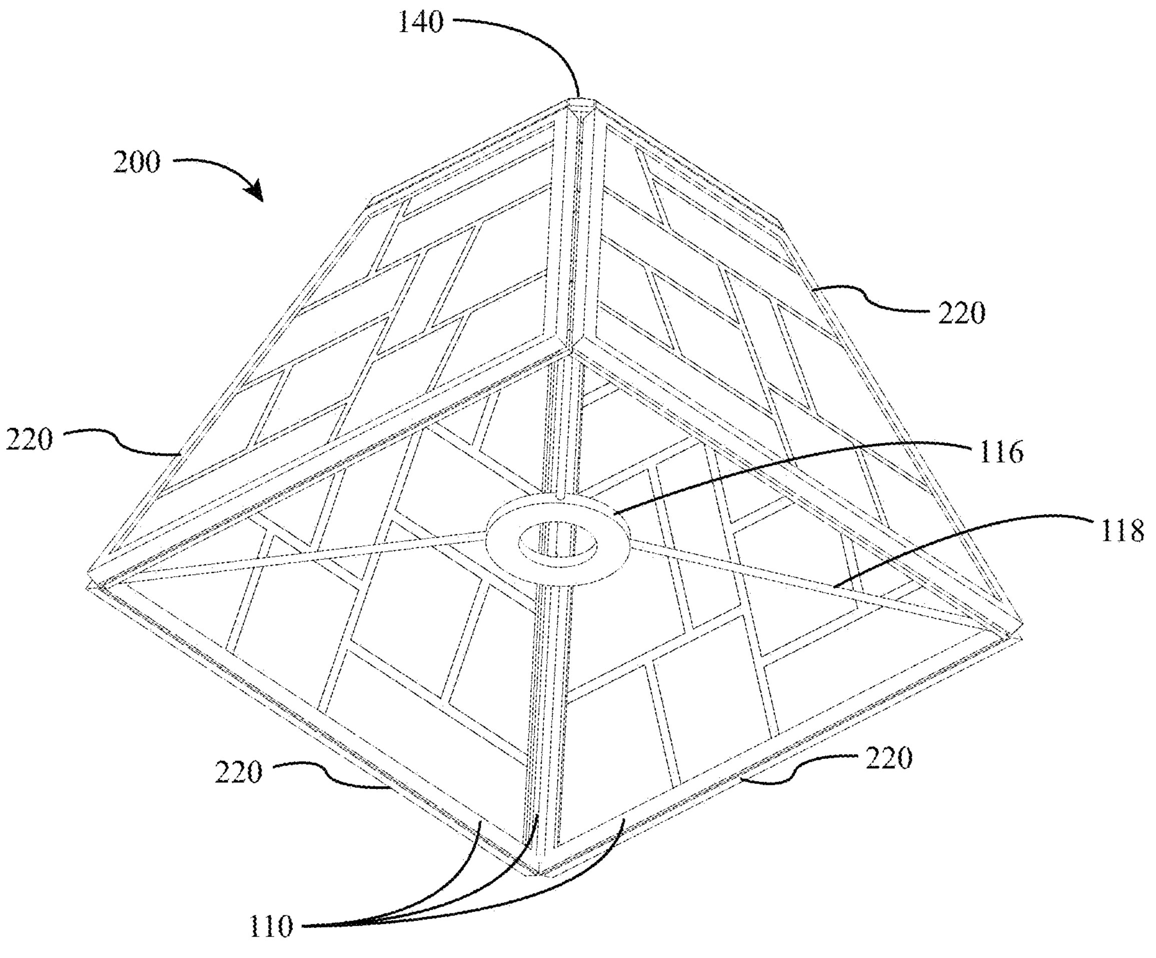
FIG. 8 is a bottom-side perspective view of the lampshade of FIG. 1.

Also, as shown in the illustrative embodiment of FIGS. 3 and 8, the lampshade 200 further comprises ring member 116 for attaching the lampshade 200 to a light bulb socket in a lamp. In the illustrative embodiment, the ring member 116 fits around the light bulb socket that holds a light bulb 115, and is secured in place by a securement ring 117 that is disposed on top of the ring member 116 (refer to FIG. 14). In the underside perspective view of FIG. 8, it can be seen that the ring member 116 is connected to the four (4) corners of the lampshade frame 110 by four (4) support leg members 118. In the illustrative embodiment, the support leg assembly 118 and ring assembly 116 may be integral to the lampshade frame 110 for attaching the lampshade 100, 200 to various lamp bases. This design may accommodate standard lamp bases 199 (see FIGS. 12 and 18) that secure the lampshade 100, 200 via the ring member 116 trapped between a lamp's protruding rim and a threaded locking mechanism. As such, the lampshade 100, 200 advantageously can be easily integrated with existing lamps.

A third illustrative embodiment of a lampshade is seen generally at 300 in FIGS. 13-17. Referring to these figures, it can be seen that, in most respects, the third illustrative embodiment is the same as the first and second illustrative embodiments. Moreover, nearly all of the elements are common to these embodiments. For the sake of brevity, the elements that the third embodiment of the lampshade has in common with the first and second embodiments will not be discussed because these components have already been described above.

As best shown in FIGS. 15 and 16, similar to the lampshades 100 and 200 described above, the lampshade 300 generally comprises a lampshade frame 110, the lampshade frame 110 including a plurality of frame members, a top frame member 111 of the plurality of frame members including a plurality of slots 112 formed in the top frame member 111; and a plurality of removable panels 120, each of the plurality of removable panels 120 having a translucent portion, and each of the plurality of removable panels 120 having a pair of panel hook portions 124 configured to be received within one of the plurality of slots 112 of the top frame member 111.

Figure 13:
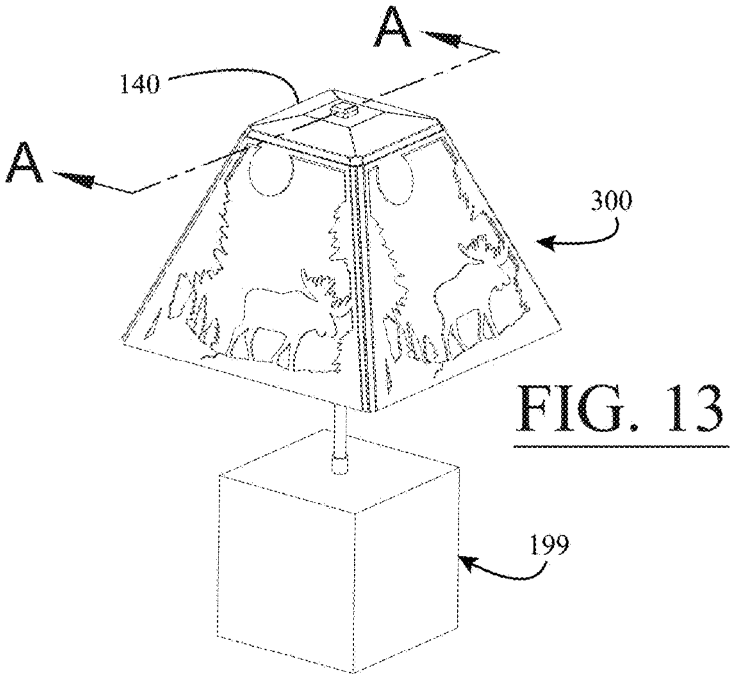
FIG. 13 is a perspective view of a lampshade with removable panels and decorative overlay panels disposed on a lamp, according to a third illustrative embodiment of the invention.

However, referring to FIGS. 13, 15, and 16, it can be seen that the lampshade 300 of the third illustrative embodiment is further provided with a plurality of decorative overlay panels 130. In the illustrative embodiment, each of the plurality of decorative overlay panels 130 is configured to fit over a respective one of the plurality of removable panels 120, and each of the plurality of decorative overlay panels 130 has at least one generally opaque decorative portion (e.g., the portion of the panel 130 in FIG. 16 with the trees and moose). Also, in the illustrative embodiment, each of the plurality of decorative overlay panels 130 has at least one generally translucent open portion 136 that allows light to selectively pass through (e.g., the open portion 136 of the panel 130 in FIG. 16 that does not comprise the trees and moose). In the illustrative embodiment, the plurality of decorative overlay panels 130 are interchangeable so that the scene depicted on the lampshade 300 is able to be changed for different occasions. Also, in the illustrative embodiment, the glass panes 128 disposed within the outer peripheral frame members 126 may also be interchangeable so that the scene depicted on the lampshade 300 is able to accommodate different occasions. In the illustrative embodiment, the open portion 136 of the decorative overlay panel 130 may be in a form of an aperture or opening through the overlay panel 130. In the illustrative embodiment, the silhouette portion of the decorative overlay panel 130 may be formed from a thin piece of metal.

In the illustrative embodiment, referring again to FIGS. 15 and 16, it can be seen that each of the plurality of decorative overlay panels 130 has a pair of overlay hook portions 134 that are configured to be received within one of the plurality of slots 112 of the top frame member 111. As shown in FIGS. 16 and 17, in the illustrative embodiment, each pair of overlay hook portions 134 is configured to be received within its respective slot 112 in a second location "B" that is separate from a first location "C" occupied by the pair of panel hook portions 124, thereby allowing for simultaneous attachment of both the removable panels 120 and the decorative overlay panels 130 to the top frame member 111 of the lampshade frame 110 without interference.

In the illustrative embodiment, turning again to FIGS. 15 and 16, the pair of overlay hook portions 134 is connected to an outer peripheral frame member of each of the plurality of decorative overlay panels 130 by respective overlay tab portions 132. As shown in FIG. 16, the overlay tab portions 132 extend outwardly from the outer peripheral frame member, and the overlay hook portions 134 extend downwardly in generally vertical orientations.

As shown in the exploded view of FIG. 18, the lampshade 200 may also be provided with one or more different styles of decorative overlay panels 230 (e.g., a silhouette panel having a sports theme) so that the lampshade 200 can be customized for various occasions.

In the first, second, and third illustrative embodiments, referring to FIGS. 1, 9, and 12-18, it can be seen that the lampshade 100, 200, 300 may further include a top cap member 140 configured to fit over a top portion of the lampshade frame 110. In the illustrative embodiments, the top cap member 140 has a plurality of tab portions 142 (e.g., four (4) centering tab portions 142 spaced approximately 90 degrees apart from each other) extending downwardly from a bottom surface of the top cap member 140 for centering and securing the top cap member 140 on the top frame member 111. Each of the plurality of cap tab portions 142 is configured to be received within one of the plurality of slots 112 of the top frame member 111. As shown in FIGS. 16 and 17, in the illustrative embodiment, each of the plurality of cap tab portions 142 is configured to be received within a respective one of the plurality of slots 112 of the top frame member 111 in a third location "A" separate from the first and second locations "C", "B" occupied respectively by the pair of panel hook portions 124 and the pair of overlay hook portions 134, thereby allowing for simultaneous attachment of the top cap member 140, the plurality of decorative overlay panels 130, and the plurality of removable panels 120 to the top frame member 111 of the lampshade frame 110 without interference. As shown in FIG. 17, each slot 112 has five (5) total slot positions or zones for receiving the hooks and tabs (e.g., one (1) central location "A" for receiving the cap tab portion 142, two (2) middle locations "B" for receiving the overlay hook portions 134, and two (2) outermost locations "C" for receiving the panel hook portions 124).

Next, referring again to the exploded view of FIG. 18, in the illustrative embodiments, the top cap member 140 may be further provided with a top cap gasket member 141. The top cap gasket member 141 is configured to be disposed between the bottom surface of the top cap member 140 and the top surface of the top frame member 111 of the lampshade frame 110 with the plurality of slots 112. Similar to the panel gasket members 119 described above, the top cap gasket member 141 is configured to dampen a movement of the top cap member 140 relative to the top frame member 111 of the lampshade frame 110. The top cap gasket member 141 is further configured to block light generated by a light source of the lamp from escaping between the bottom surface of the top cap member 140 and the top surface of the top frame member 111 of the lampshade frame 110. That is, the top cap gasket member 141 is configured for light leakage prevention and vibration dampening between the top cap member 140 and the lampshade frame 110 (e.g., if the lampshade is subjected to external building vibrations).

Figure 20:
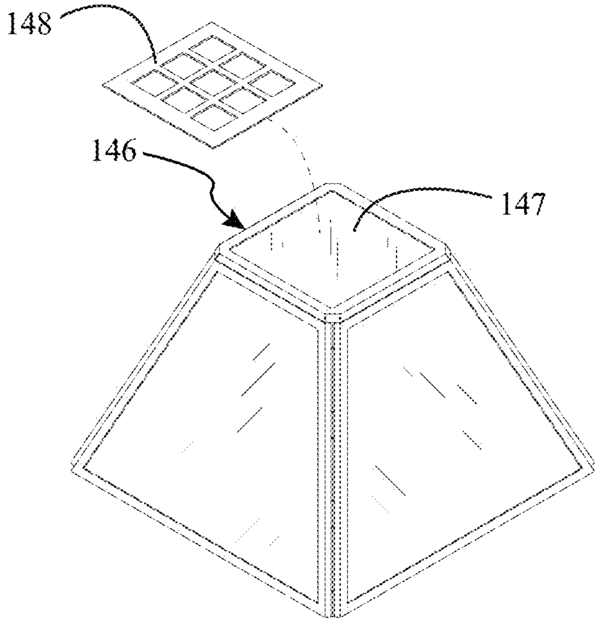
FIG. 20 is a perspective view of a lampshade similar to that of FIG. 11, except that the lampshade is provided with a different type of top cap member.

Turning to FIG. 20, an alternative embodiment of the top cap member 140 of the lampshade is depicted. As shown in FIG. 20, the top cap member 146 comprises a glass panel 147 disposed in an outer peripheral frame member, similar to the plurality of removable panels 120 described above. Also, as shown in FIG. 20, the top cap member 146 of the alterative embodiment may be provided with an overlay plate 148 with a pattern silhouette that is configured to fit over the glass panel 147 in the recessed area formed by the thickness of the outer peripheral frame member.

Figure 19:
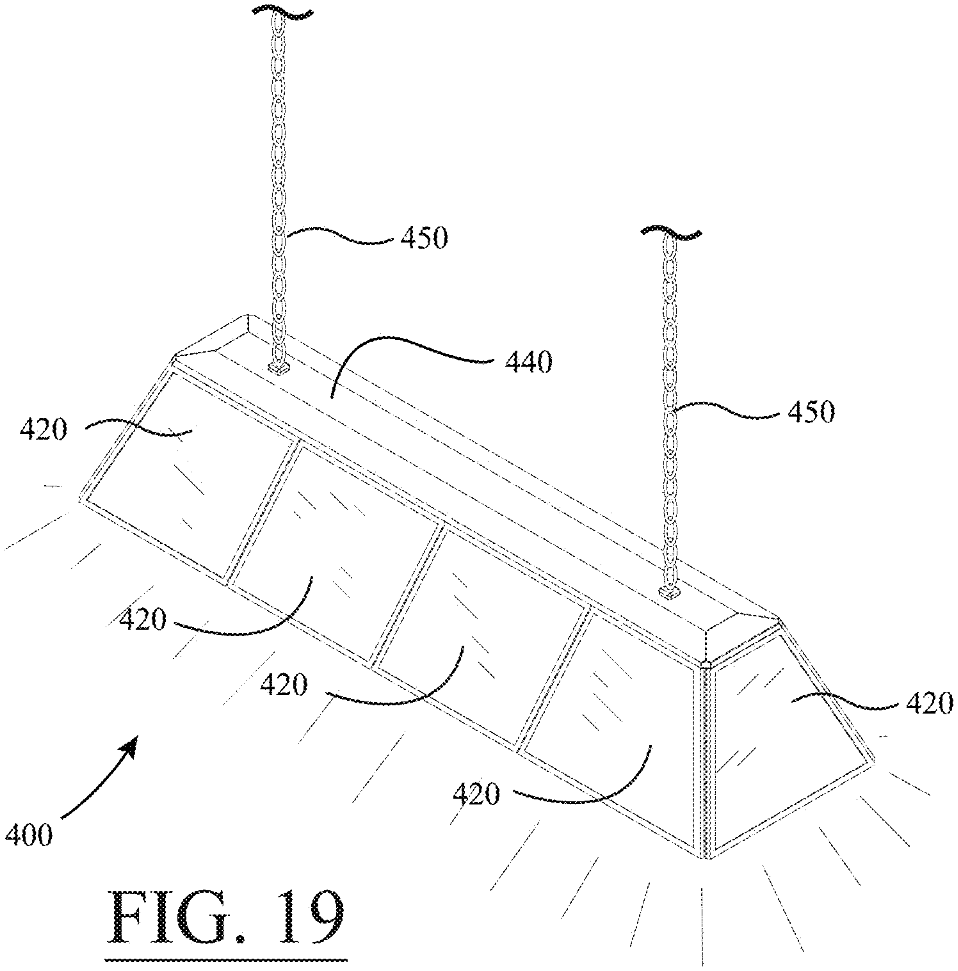
FIG. 19 is a top-side perspective view of a lampshade with removable panels in a hanging installation, according to a fourth illustrative embodiment of the invention.

A fourth illustrative embodiment of a lampshade is seen generally at 400 in FIG. 19. Referring to this figure, it can be seen that, in many respects, the fourth illustrative embodiment is the same as the preceding illustrative embodiments. Moreover, many of the elements are common to all of these embodiments. For the sake of brevity, the elements that the fourth embodiment of the lampshade has in common with the first, second, and third embodiments will not be discussed because these components have already been described above.

As shown in FIG. 19, similar to the lampshades 100, 200, 300 described above, the lampshade 400 generally comprises a lampshade frame, the lampshade frame including a plurality of frame members, a top frame member of the plurality of frame members including a plurality of slots formed in the top frame member; and a plurality of removable panels 420, each of the plurality of removable panels 420 having a translucent portion, and each of the plurality of removable panels 420 having a pair of panel hook portions configured to be received within one of the plurality of slots of the top frame member.

However, referring to FIG. 19, unlike the preceding embodiments, it can be seen that the lampshade 400 of the fourth illustrative embodiment has an elongated shape, rather than the truncated pyramidal shape of the previously described embodiments. Also, referring again to the illustrative embodiment of FIG. 19, unlike the preceding embodiments, the lampshade 400 is part of a hanging-type lighting fixture, such as the type used above pool tables. As such, the lighting fixture with lampshade 400 is configured to be mounted overhead to a building structure, such as a ceiling structure, by means of suspension mounting hang chains 450. In addition, as shown in the illustrative embodiment of FIG. 19, the lampshade 400 is provided with an elongated top cap member 440 for the chandelier-style mounting of the lighting fixture. In the illustrative embodiment, the elongated top cap member 440 may be attached to the top frame member of the lampshade frame by a plurality of tab portions, which are similar to the plurality of tab portions 142 described above for the top cap member 140. With reference again to FIG. 19, because of its elongate configuration, the lampshade 400 of the fourth illustrative embodiment may be provided with a total of ten (10) removable panels 420 (e.g., four (4) rectangular panels in the middle of the lampshade 400, three (3) trapezoidal panels disposed at a first end of the lampshade 400, and three (3) trapezoidal panels disposed at a second end of the lampshade 400).

In one or more further illustrative embodiments, referring to FIGS. 16-19, a method for assembling a lampshade 100, 200, 300, 400 is disclosed. The method comprising the steps of: (i) providing a lampshade 100, 200, 300, 400 that includes a lampshade frame and a plurality of removable interchangeable panels 120, 220, 420; (ii) aligning the pair of panel hook portions 124, 224 of one of the plurality of removable interchangeable panels 120, 220, 420 with a respective one of the plurality of slots 112 formed in the top frame member of the lampshade frame; and (iii) inserting the pair of panel hook portions 124, 224 of one of the plurality of removable interchangeable panels 120, 220, 420 into the respective one of the plurality of slots 112 so as to hang the removable interchangeable panel 120, 220, 420 on the lampshade frame.

In these one or more illustrative embodiments, referring primarily to FIGS. 16 and 17, the method may further comprise the steps of: (iv) providing a plurality of decorative overlay panels 130, 230 configured to fit over respective ones of the removable interchangeable panels 120, 220, 420; (v) aligning the pair of overlay hook portions 134 of one of the plurality of decorative overlay panels 130, 230 with a respective one of the plurality of slots 112 formed in the top frame member of the lampshade frame, the pair of overlay hook portions 134 configured to be received within the respective one of the plurality of slots 112 in a second location "B" separate from a first location "C" occupied by the pair of panel hook portions 124, 224; and (vi) inserting the pair of overlay hook portions 134 of the one of the plurality of decorative overlay panels 130, 230 into the second location "B" of the respective one of the plurality of slots 112 so as to hang the one of the plurality of decorative overlay panels 130, 230 on the lampshade frame over a respective one of the removable interchangeable panels 120, 220, 420.

In these one or more illustrative embodiments, referring primarily to FIGS. 16 and 17, the method may further comprise the steps of: (vii) providing a top cap member 140, 440 configured to fit over a top portion of the lampshade frame; (viii) aligning the plurality of tab portions 142 of the top cap member 140, 440 with respective ones of the plurality of slots 112 in the top frame member of the lampshade frame, the plurality of tab portions 142 configured to be received within the plurality of slots 112 in third locations "A" separate from the first and second locations "C", "B" occupied respectively by the pair of panel hook portions 124, 224 and the pairs of overlay hook portions 134; and (ix) inserting the plurality of tab portions 142 of the top cap member 140, 440 into the third locations "A" of the plurality of slots 112 formed in the top frame member of the lampshade frame so as to attach the top cap member 140, 440 on the top portion of the lampshade frame.

Figure 14:
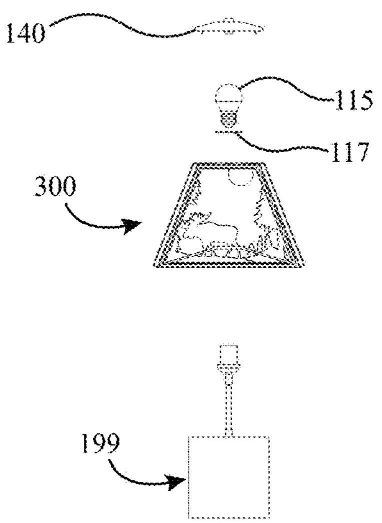
FIG. 14 is a partially exploded side elevational view of the lampshade and lamp of FIG. 13, wherein the lampshade, top cap member, and light bulb are shown removed from the lamp.

FIG. 14 depicts the illustrative manner in which the lampshade 100, 200, 300 is removed from a lamp. First, the top cap member 140 is removed from the lampshade 100, 200, 300. Then, the light bulb 115 is unscrewed from the light bulb socket. Then, the securement ring 117 is removed from the light bulb socket. Finally, the ring member 116 of the lampshade 100, 200, 300 is lifted off the light bulb socket, and the lampshade 100, 200, 300 is removed from the lamp.

In the illustrative embodiments described above, a customizable lampshade system is described. The customizable lampshade system is specifically designed for enhanced user adaptability and aesthetic versatility. Advantageously, the lampshade system provides a solution for users seeking versatility in lampshade design, allowing for easy modifications and a wide range of aesthetic possibilities. In some illustrative embodiments, the customizable lampshade system is particularly for use with stained glass lamps. The lampshade is designed to accommodate interchangeable panels, allowing users to easily modify the appearance and lighting effects to suit their preferences. In some illustrative embodiments, the lampshade system may comprise an open framework 110, a plurality of glass panels 120, 220, 420, a plurality of silhouette panels 130, 230, a top cap 140, 440, and a plurality of rubber gaskets 119, 141.

In one or more illustrative embodiments, the structural framework 110 may be fabricated from thin sheet metal, precision-crafted through bending and laser cutting or punching. This ensures openings on each side of the shade, designed to accommodate panels of varying materials, such as glass, plastic, or acrylic. In some illustrative embodiments, structural framework 110 is in a form of an open framework that is constructed from thin sheet metal, which is bent and laser cut or punched to create an open structure with side walls and a top plane portion. In these illustrative embodiments, the framework 110 has four rectangular side walls, although it will be understood that other geometric configurations, such as pentagons or hexagons, are also possible. In some illustrative embodiments, the top plane portion 111 includes a plurality of elongated slots 112, each slot 112 being positioned proximate to and extending along a respective edge of the top plane portion 111. Similarly, each side wall may comprise a plurality of elongated slots, extending along the length of the respective side wall. These elongated slots are designed to receive and secure the glass panels and silhouette panels. In some illustrative embodiments, the side walls are angled outwardly from top to bottom, such that the bottom opening of the framework is larger than the top opening. This angled configuration ensures that the glass panels 120, 220, 420, once hung in place, will lay flush against the side walls under the influence of gravity.

In one or more illustrative embodiments, the internal structure of the lampshade framework 110 includes thin legs 118 welded or attached to the underside of the top plane portion or the side walls. These legs 118 converge and meet with an open circular ring 116, which can be used to attach the lampshade system to a light bulb socket or other lamp base components. This internal structure is a typical configuration for many small lamps, although other configurations can be envisioned to accommodate different lamp styles.

In one or more illustrative embodiments, the removable panels 120, 220, 420 are interchangeable panels that can be securely hung onto the lampshade framework 110. These panels 120, 220, 420 may be encased within a metallic frame, with a specially designed tab 122, 222 equipped with a hook-like structure 124, 224 at the top. This tab structure 122, 222 allows for easy insertion into slots 112 present on the lampshade's framework, ensuring secure placement. In some illustrative embodiments, each glass panel 120, 220, 420 comprises a panel body sized to fit within the interior space of the open framework. The panel body is surrounded by a metal border, which is a common feature in stained glass construction. Extending from the top edge of the metal border is at least one tab 122, which is bent downwardly to form a hook portion 124. The hook portion 124 is sized and shaped to be removably captured within a respective elongated slot 112 in the top plane portion 111 or a side wall of the framework 110. In some illustrative embodiments, the elongated slots 112 are sized to accommodate five tab positions per side of the lampshade 100, 200, 300, 400. The glass panels 120, 220, 420 occupy the two outermost tab positions at each end of the elongated slots 112, ensuring a consistent and secure positioning of the panels 120, 220, 420 within the framework.

In one or more illustrative embodiments, to address potential discrepancies between the lampshade framework 110 and the glass panel borders, a rubber or silicone gasket 119 may be affixed to the framework 110. This gasket 119 not only seals any possible light leakage through minute gaps but also offers vibrational dampening, reducing noise due to environmental factors. In some illustrative embodiments, to prevent light leakage and dampen vibrations, rubber gaskets 119 are adhered to the interior surfaces of the side walls, forming a seal between the glass panels 120, 220, 420 and the framework 110. The gaskets 119 have a cut-out area corresponding to the open areas of the side walls, allowing direct exposure of the translucent glass panels to the interior light source.

In one or more illustrative embodiments, adding to the customizable nature of the lampshade 100, 200, 300 are silhouette overlays 130, 230 crafted from thin sheet metal. These overlays, which can depict various scenes or logos, are designed to be placed over the primary glass panels. With a similar tab design as the glass panels, they can utilize the framework slots for attachment. In some illustrative embodiments, in addition to the glass panels, the lampshade system also incorporates the plurality of light-blocking silhouette panels 130, 230. These silhouette panels 130, 230 are designed with tab and hook features similar to those of the glass panels, allowing them to be hung within the elongated slots of the framework. Specifically, the silhouette panels are positioned to occupy the remaining two tab positions within each elongated slot 112, overlaying a portion of the glass panels. The silhouette panels 130, 230 can depict various scenes, logos, or designs, providing an additional layer of aesthetic customization to the lampshade.

In one or more illustrative embodiments, as an additional part of the assembly, a removable top cap 140, 440 is provided, featuring a generally horizontal upper surface and a circumferential sidewall extending downwardly. On the underside of the upper surface, a plurality of vertical tabs 142 are positioned proximate to each edge. These vertical tabs 142 are sized and located to be removably captured within the center positions of the elongated slots 112 in the top plane portion 111 of the framework 110. The top cap 140, 440 serves to conceal the tab and slot mechanisms, providing a clean and finished appearance to the top of the lampshade 100, 200, 300, 400.

In one or more illustrative embodiments, the entire lampshade system is designed for modularity and user preference. With the ability to switch out glass panels and silhouette overlays, users can easily modify the lampshade's appearance to align with room themes, events, or personal aesthetics.

In an alternative embodiment, an accessory top volume can be fitted into the upper slots of the lampshade, offering additional design possibilities.

An additional embodiment includes decorative elements that can be hung from the bottom edges of the glass panels, further enhancing the aesthetic appeal of the lampshade.

In an alternative embodiment, as shown in FIG. 19, for larger spaces, the lampshade system can be scaled up to a chandelier-style variant. In this embodiment, the lampshade framework is suspended from the ceiling by cables or chains 450, allowing for overhead lighting in larger areas. In this embodiment, the larger, more elaborate version of the lampshade 400 is designed for overhead lighting, often in communal spaces or over tables, characterized by multiple panels 420 and decorative elements such as hang chains 450.

In one or more illustrative embodiments, the lampshade system can be offered as a kit, which may include a lamp base with a bulb, the shade framework 110, multiple glass panels 120, 220 of various opacities and colors, sample silhouette panels 130, 230, and two versions of the top cap 140, 146, one solid 140 and one with a central glass pane 146 (see e.g., FIGS. 18 and 20). By providing interchangeable glass panels, silhouette panels, and top cap options, various illustrative embodiments of the lampshade 100, 200, 300 described herein allow users to customize the appearance and lighting effects of the lampshade with ease. The system's modular design encourages creative expression and adaptability, enabling users to change the mood of a room, match colors for holidays or sports teams, or simply explore different aesthetic possibilities.

Figure 21:
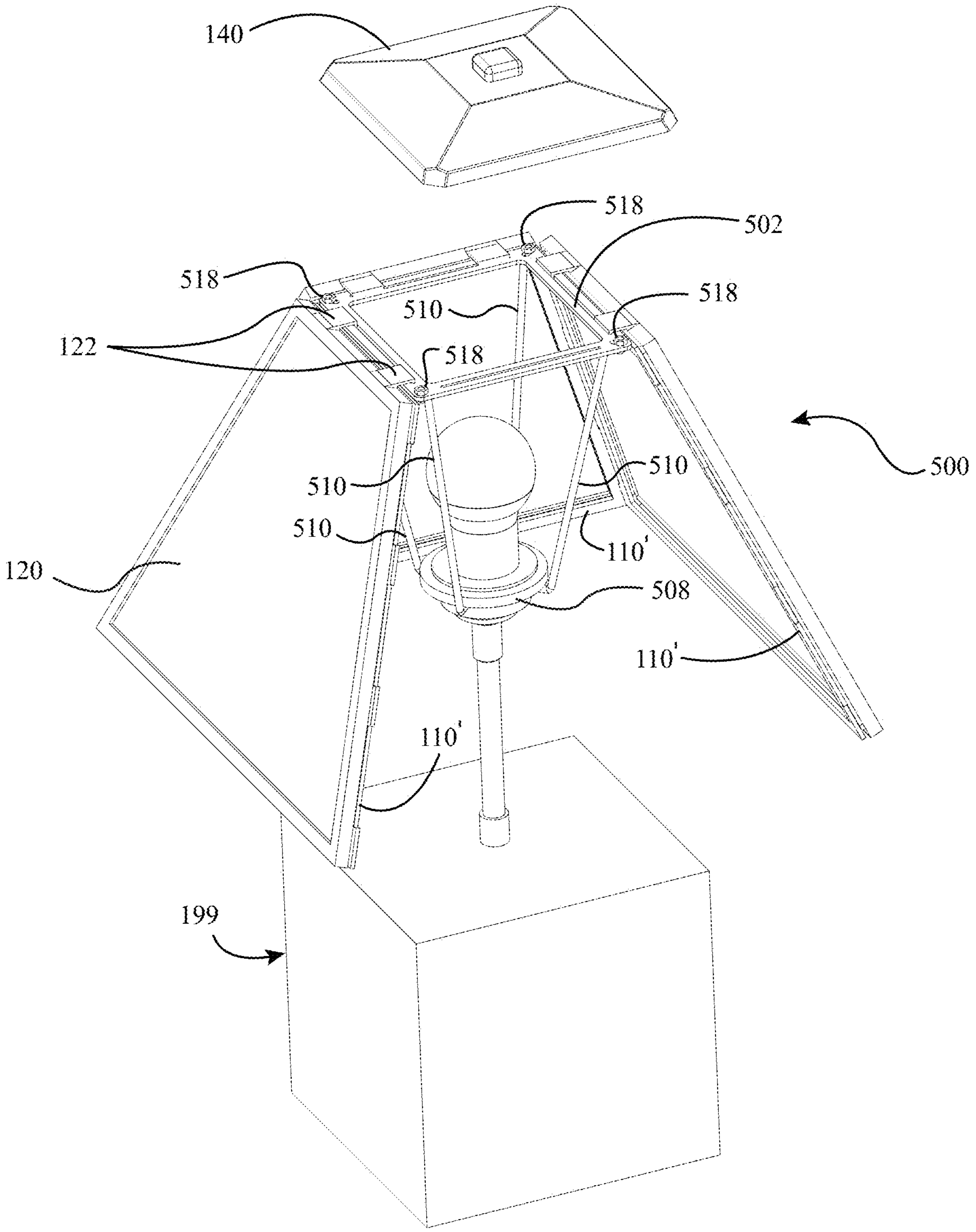
FIG. 21 is a top-side perspective view of a lampshade with removable panels disposed on a lamp, according to a fifth illustrative embodiment of the invention.
Figure 22:
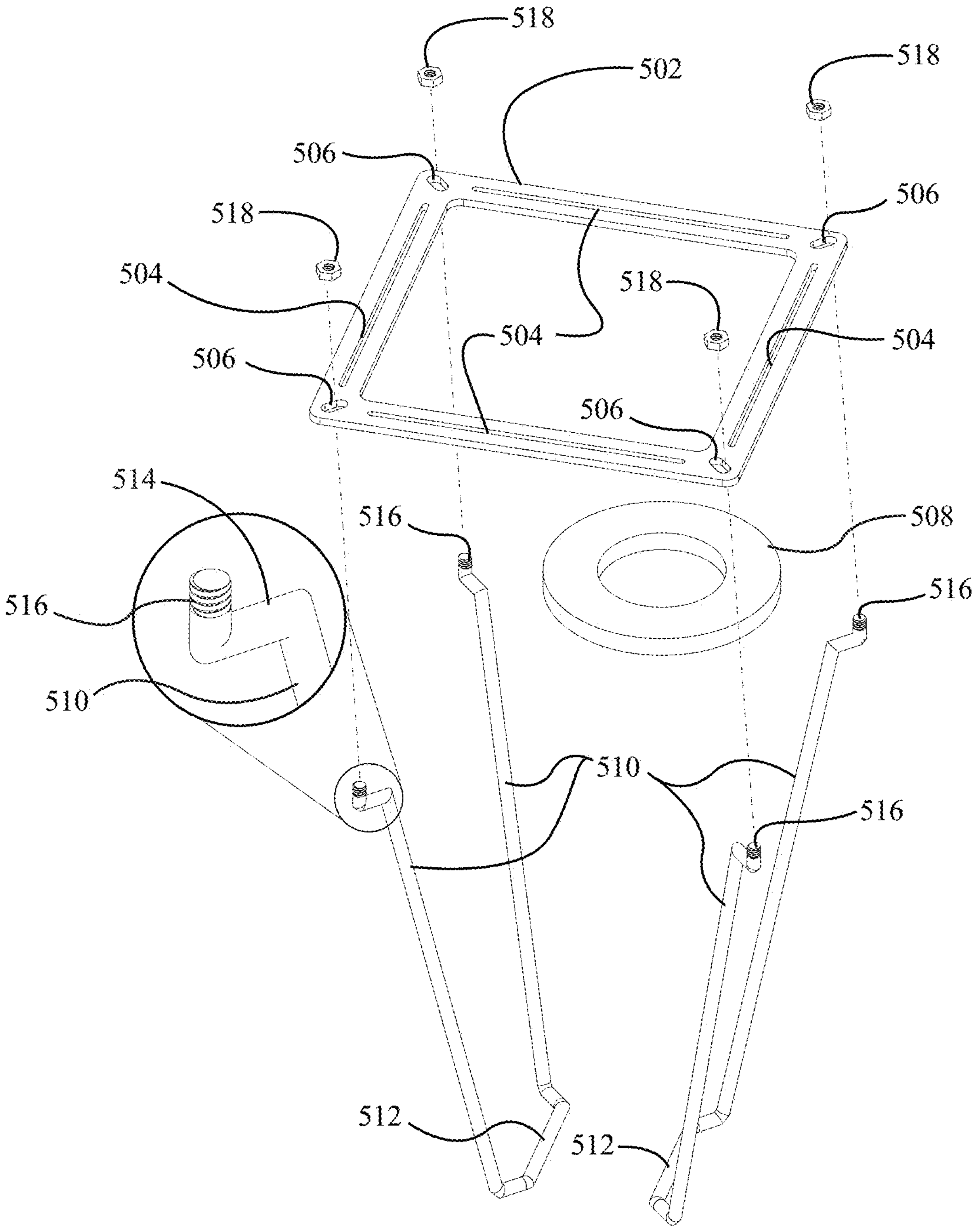
FIG. 22 is an exploded perspective view of the support structure of the lampshade of FIG. 21.

A fifth illustrative embodiment of a lampshade is seen generally at 500 in FIGS. 21 and 22. Referring to these figures, it can be seen that, in many respects, the fifth illustrative embodiment is the same as the preceding illustrative embodiments. Moreover, many of the elements are common to all of these embodiments. For the sake of brevity, the elements that the fifth embodiment of the lampshade has in common with the first, second, third, and fourth embodiments will not be discussed because these components have already been described above.

As shown in FIGS. 21 and 22, similar to the lampshade 100, 200, 300, 400 described above, the lampshade 500 generally comprises a lampshade frame 110', the lampshade frame 110' including a plurality of frame members, a top frame member 502 of the plurality of frame members including a plurality of slots 504 formed in the top frame member 502; and a plurality of removable panels 120, each of the plurality of removable panels 120 having a translucent portion, and each of the plurality of removable panels 120 having a pair of panel tab portions 122 with hook portions configured to be received within one of the plurality of slots 504 of the top frame member 502. In addition, referring to FIG. 22, it can be seen that the top frame member 502 of the lampshade frame 110' further includes a plurality of elongated apertures 506 formed in the respective corners thereof. As will be described hereinafter, each of the elongated apertures 506 of the top frame member 502 is configured to receive a threaded end portion 516 of a respective vertical support arm 510 (see FIGS. 21 and 22). As shown in FIG. 21, the lampshade 500 is configured to be disposed on a lamp with a lamp base 199, and the lampshade 500 includes a removable top cap member 140, similar to the embodiments described above.

However, referring to FIGS. 21 and 22, it can be seen that the lampshade frame 110' of the lampshade 500 is different from the lampshade frame 110 in the preceding embodiments. In particular, rather than supporting the frame 110 at the bottom thereof using the support leg members 118, the lampshade frame 110' of the lampshade 500 is supported by the four (4) vertical support arms 510 that extend upwardly from the ring member 508. In the illustrative embodiment, as best shown in FIG. 22, two (2) of the vertical support arms 510 are connected to one another by a base connecting member 512. As such, there are two (2) pairs of vertical support arms 510 in the illustrative embodiment. Each pair of vertical support arms 510 has a yoke or harp-like shape in the illustrative embodiment. Also, in the illustrative embodiment, the base connecting member 512 of each pair of vertical support arms 510 is fixedly attached to the ring member 508 (e.g., by welding). Referring again to FIG. 22, it can be seen that the top end section of vertical support arm 510 comprises a double approximately right angle bend with a top offset portion 514 that extends horizontal or generally horizontal to a vertically extending threaded end portion 516. In the illustrative embodiment, as shown in FIG. 22, the threaded end portion 516 of each vertical support arm 510 comprises a plurality of external threads that correspond to a plurality of internal threads on a fastener member (e.g., a nut 518). In the illustrative embodiment, each nut 518 securely attaches a respective one of the vertical support arms 510 to a respective corner of the top frame member 502 after the threaded end portion 516 of the vertical support arm 510 is inserted through its respective elongated aperture 506 in the top frame member 502.

Referring again to FIG. 21, it can be seen that one of the side walls of the lampshade frame 110' has been cut away to better illustrative the internal components of the frame 110' in the fifth embodiment. In the illustrative embodiment, each pair of vertical support arms 510 may comprise two (2) bent wires that are tack welded to the retention ring 508 that is configured to sit on the bulb socket housing (see FIG. 21). In the fifth illustrative embodiment, the top frame member 502 (e.g., in the form of a top square plate) of the lampshade 500 is generally the same as in the preceding embodiments, with the exception of the elongated aperture 506 provided in each of the four (4) corners that accept the threaded end portion 516 of each vertical support arm 510. As explained above, the threaded end portion 516 of each vertical support arm 510 is threaded at its upper termination point such that a small hex nut 518 can be used to trap the top frame member 502 in between top offset portion 514 at the top of each vertical support arm 510 and the nut 518 itself. In the illustrative embodiment, being very thin and only protruding above the top frame member 502 by a fraction of an inch, the nut 518 and the top portion 516 of each vertical support arm 510 will be covered by the removable top cap member 140.

Turning again to the exploded view of FIG. 22, the removable parts of the lampshade frame 110' that are different from the preceding embodiments are clearly shown. In the illustrative embodiment, as explained above, the base connecting member 512 of each pair of vertical support arms 510 may be welded to the retention ring member 508. Also, as explained above, in the illustrative embodiment, the threaded end portion 516 of each vertical support arm 510 has a bend just below the threads at a 90 degree angle or approximately 90 degree angle to create a shelf (i.e., top offset portion 514) that holds the square top frame member 502. The elongated apertures 506 in each corner of the top frame member 502 align with the vertical support arms 510, and just the threaded top portion 516 of each vertical support arm 510 protrudes through the elongated aperture 506 in the top frame member 502. In the illustrative embodiment, a user simply places the nuts 518 on each threaded end portion 516 of each vertical support arm 510, and tightens down the nuts to trap the top frame member 502 of the lampshade 500.

The fifth illustrative embodiment of the lampshade 500 has several useful characteristics. First of all, supporting the weight of the glass side walls of the lampshade 500 from the top, rather than using the support leg members 118 for support at the bottom of the lampshade, enhances the structural stability of the lampshade 500 (e.g., gravity better assists in keeping the lampshade 500 stable). Moreover, in the illustrative embodiment, the lampshade frame 110' of the lampshade 500 results in more cost effective manufacturing of the lampshade 500 because six (6) weld spots have been eliminated by substituting the vertical support arms 510 for the support leg members 118. Furthermore, making the vertical support arms 510 removable from the remainder of the lampshade frame 110', allows cage portions of the lampshade frames 110' (formed by the plurality of side frame members) to be nested inside one another during manufacturing (saving a lot of space), shipping, and assembly. Once a unit is complete the open center of the shade frame can be used to house the glass panels which can be wrapped in foam. The four (4) armed "harp" of the lampshade frame 110', which comprises the retention ring member 508 and the four (4) vertical support arms 510, can then be placed over the top of the panels and still nest generally inside. Advantageously, this allows a more compact shipping box for individual units.

It is readily apparent that the aforedescribed lampshade 100, 200, 300, 400, 500 offers numerous advantages. For example, the lampshade 100, 200, 300, 400, 500 includes removable panels 120, 220, 420, that are interchangeable and/or replaceable so as to allow for a dynamic and adaptable lighting piece in one's home or office. In one or more illustrative embodiments described above, the lampshade 100, 200, 300, 400, 500 has customizable features for interchanging panels and silhouette overlays. Advantageously, in one or more illustrative embodiments, the lampshade 100, 200, 300, 400, 500 offers both the beauty of stained glass and the adaptability to cater to the dynamic decor needs of modern living spaces. The stained glass panels can be easily interchanged, and additional silhouette overlays can be added or removed. As such, the lampshade 100, 200, 300, 400, 500 advantageously provides users with a versatile piece of decor, adaptable to various occasions, themes, and personal preferences, eliminating the monotony of static designs.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A lampshade configured to be disposed on a lamp, the lampshade comprising a lampshade frame, the lampshade frame including a plurality of frame members, at least one of the plurality of frame members including at least one slot formed in the at least one of the plurality of frame members; and one or more removable panels, at least one of the one or more removable panels having a translucent portion, and the at least one of the one or more removable panels having at least one panel hook portion configured to be received within the at least one slot of the at least one of the plurality of frame members;

wherein the plurality of frame members of the lampshade frame define a plurality of side openings, at least one of the plurality of side openings configured to be covered by the at least one of the one or more removable panels.

2. The lampshade according to claim 1, wherein the plurality of frame members of the lampshade frame comprise one or more top frame members, a plurality of side frame members, and one or more bottom frame members; and wherein the at least one of the plurality of frame members that includes the at least one slot is at least one of the one or more top frame members.

3. The lampshade according to claim 1, wherein the one or more removable panels comprise a plurality of interchangeable panels, and the at least one slot comprises a plurality of slots formed in one or more of the plurality of frame members;

wherein each of the plurality of interchangeable panels comprises at least one respective panel hook portion configured to be received in a respective one of the plurality of slots formed in the one or more of the plurality of frame members, the plurality of interchangeable panels being disposed on different sides of the lampshade.

4. The lampshade according to claim 1, wherein the translucent portion of the at least one of the one or more removable panels is formed by a translucent glass panel or a translucent polymeric panel disposed within an outer peripheral frame member.

5. The lampshade according to claim 4, wherein the at least one panel hook portion is connected to the outer peripheral frame member of the at least one of the one or more removable panels by a panel tab portion, the panel tab portion extending outwardly from the outer peripheral frame member, and the at least one panel hook portion extending downwardly in a generally vertical orientation.

6. The lampshade according to claim 1, further comprising a panel gasket member, the panel gasket member configured to be disposed between a rear surface of the at least one of the one or more removable panels and a front surface of one or more of the plurality of frame members, the panel gasket member configured to dampen a movement of the at least one of the one or more removable panels relative to the one or more of the plurality of frame members, and the panel gasket member further configured to block light generated by a light source of the lamp from escaping between the front surface of the one or more of the plurality of frame members and the rear surface of the at least one of the one or more removable panels.

7. The lampshade according to claim 1, further comprising one or more decorative overlay panels, at least one of the one or more decorative overlay panels configured to fit over the at least one of the one or more removable panels, the at least one of the one or more decorative overlay panels having at least one generally opaque decorative portion, and the at least one of the one or more decorative overlay panels having at least one overlay hook portion configured to be received within the at least one slot of the at least one of the plurality of frame members, the at least one overlay hook portion configured to be received within the at least one slot in a second location separate from a first location occupied by the at least one panel hook portion, thereby allowing for simultaneous attachment of both the at least one of the one or more removable panels and the at least one of the one or more decorative overlay panels to the at least one of the plurality of frame members of the lampshade frame without interference.

8. The lampshade according to claim 7, wherein the at least one overlay hook portion is connected to an outer peripheral frame of the at least one of the one or more decorative overlay panels by an overlay tab portion, the overlay tab portion extending outwardly from the outer peripheral frame, and the at least one overlay hook portion extending downwardly in a generally vertical orientation.

9. The lampshade according to claim 1, further comprising a top cap member configured to fit over a top portion of the lampshade frame, the top cap member having at least one cap tab portion extending downwardly from a bottom surface of the top cap member, the at least one cap tab portion configured to be received within the at least one slot of the at least one of the plurality of frame members, the at least one cap tab portion configured to be received within the at least one slot in a third location separate from first and second locations occupied respectively by the at least one panel hook portion and at least one overlay hook portion, thereby allowing for simultaneous attachment of the top cap member, a decorative overlay panel, and the at least one of the one or more removable panels to the at least one of the plurality of frame members of the lampshade frame without interference.

10. The lampshade according to claim 9, further comprising a top cap gasket member, the top cap gasket member configured to be disposed between the bottom surface of the top cap member and the at least one of the plurality of frame members with the at least one slot.

11. The lampshade according to claim 1, wherein the at least one panel hook portion of the at least one of the one or more removable panels comprises a pair of spaced-apart panel hook portions, the pair of spaced-apart panel hook portions configured to be received within the at least one slot of the at least one of the plurality of frame members.

12. The lampshade according to claim 1, wherein the plurality of frame members of the lampshade frame comprise a top frame member, a plurality of side frame members, and one or more bottom frame members; and wherein the at least one of the plurality of frame members that includes the at least one slot is the top frame member; and wherein the top frame member further includes at least one elongate aperture disposed through the top frame member, the at least one elongate aperture being spaced apart from the at least one slot of the top frame member.

13. The lampshade according to claim 12, wherein the lampshade frame further comprises at least one vertical support arm attached to a retention ring member, the at least one vertical support arm including an end portion that is configured to be received within the at least one elongate aperture of the top frame member, and the retention ring member being configured to attach the lampshade frame to a light bulb socket in a lamp.

14. The lampshade according to claim 13, wherein the at least one vertical support arm of the lampshade frame further comprises a top offset portion forming a support surface on which a portion of the top frame member is configured to rest; and wherein the end portion of the at least one vertical support arm of the lampshade frame is in a form of a threaded end portion that is configured to be threadingly engaged with a fastener member, the portion of the top frame member configured to be sandwiched between the fastener member and the top offset portion of the at least one vertical support arm.

15. A method for assembling a lampshade, the method comprising the steps of:

providing a lampshade that includes:

a lampshade frame, the lampshade frame including a plurality of frame members, at least one of the plurality of frame members including at least one slot formed in the at least one of the plurality of frame members; and one or more removable panels, at least one of the one or more removable panels having a translucent portion, and the at least one of the one or more removable panels having at least one panel hook portion configured to be received within the at least one slot of the at least one of the plurality of frame members;

aligning the at least one panel hook portion of the at least one of the one or more removable panels with the at least one slot formed in the at least one of the plurality of frame members;

inserting the at least one panel hook portion of the at least one of the one or more removable panels into the at least one slot formed in the at least one of the plurality of frame members so as to hang the at least one of the one or more removable panels on the lampshade frame;

providing one or more decorative overlay panels, at least one of the one or more decorative overlay panels configured to fit over the at least one of the one or more removable panels, the at least one of the one or more decorative overlay panels having at least one generally opaque decorative portion, and the at least one of the one or more decorative overlay panels having at least one overlay hook portion configured to be received within the at least one slot of the at least one of the plurality of frame members, the at least one overlay hook portion configured to be received within the at least one slot in a second location separate from a first location occupied by the at least one panel hook portion;

aligning the at least one overlay hook portion of the at least one of the one or more decorative overlay panels with the at least one slot formed in the at least one of the plurality of frame members; and inserting the at least one overlay hook portion of the at least one of the one or more decorative overlay panels into the second location of the at least one slot formed in the at least one of the plurality of frame members so as to hang the at least one of the one or more decorative overlay panels on the lampshade frame over the at least one of the one or more removable panels.

16. The method according to claim 15, wherein the one or more removable panels comprise a plurality of interchangeable panels, the at least one panel hook portion comprises one or more respective hook portions on each of the plurality of interchangeable panels, and the at least one slot comprises a plurality of slots formed in one or more of the plurality of frame members; and the method further comprises the steps of:

aligning each of the one or more respective hook portions on each of the plurality of interchangeable panels with a respective one of the plurality of slots formed in the one or more of the plurality of frame members; and inserting each of the one or more respective hook portions on each of the plurality of interchangeable panels into the respective one of the plurality of slots formed in the one or more of the plurality of frame members so as to hang the plurality of interchangeable panels around sides of the lampshade frame.

17. The method according to claim 15, wherein the method further comprises the steps of:

providing a top cap member configured to fit over a top portion of the lampshade frame, the top cap member having at least one cap tab portion extending downwardly from a bottom surface of the top cap member, the at least one cap tab portion configured to be received within the at least one slot of the at least one of the plurality of frame members, the at least one cap tab portion configured to be received within the at least one slot in a third location separate from the first and second locations occupied respectively by the at least one panel hook portion and the at least one overlay hook portion;

aligning the at least one cap tab portion of the top cap member with the at least one slot formed in the at least one of the plurality of frame members; and inserting the at least one cap tab portion of the top cap member into the third location of the at least one slot formed in the at least one of the plurality of frame members so as to attach the top cap member on the top portion of the lampshade frame.

18. A lampshade configured to be disposed on a lamp, the lampshade comprising:

a lampshade frame, the lampshade frame including a plurality of frame members, at least one of the plurality of frame members including at least one slot formed in the at least one of the plurality of frame members; and one or more removable panels, at least one of the one or more removable panels having a translucent portion in an outer peripheral frame member, and the at least one of the one or more removable panels having at least one panel hook portion configured to be received within the at least one slot of the at least one of the plurality of frame members;

wherein the translucent portion of the at least one of the one or more removable panels is formed by a translucent glass panel disposed within the outer peripheral frame member, or a translucent polymeric panel disposed within the outer peripheral frame member.

19. The lampshade according to claim 18, wherein the plurality of frame members of the lampshade frame define a plurality of side openings, at least one of the plurality of side openings configured to be covered by the at least one of the one or more removable panels.

20. The lampshade according to claim 18, wherein the plurality of frame members of the lampshade frame comprise one or more top frame members, a plurality of side frame members, and one or more bottom frame members; and wherein the at least one of the plurality of frame members that includes the at least one slot is at least one of the one or more top frame members.

* * * * *